United States Patent
Ledford et al.

(10) Patent No.: US 9,994,727 B2
(45) Date of Patent: Jun. 12, 2018

(54) LOW VOC ADHESION PRETREATING AND PAINT ADDITIVE COMPOSITIONS, PRETREATING AND PAINT COMPOSITIONS THEREFROM AND METHODS OF MAKING AND USING SAME

(71) Applicant: Packaging Service Co., Inc., Pearland, TX (US)

(72) Inventors: John S. Ledford, Pearland, TX (US); C. Johnson, Pearland, TX (US); Amber Livesay, Pearland, TX (US); Lynn Place, Pearland, TX (US); T. J. Minor, Pearland, TX (US); Jason Olson, Pearland, TX (US)

(*) Notice: Subject to any disclaimer, the term of this patent is extended or adjusted under 35 U.S.C. 154(b) by 0 days. days.

(21) Appl. No.: 14/605,248

(22) Filed: Jan. 26, 2015

(65) Prior Publication Data

US 2015/0299499 A1    Oct. 22, 2015

Related U.S. Application Data

(60) Provisional application No. 61/931,517, filed on Jan. 24, 2014.

(51) Int. Cl.
| | | |
|---|---|---|
| *C09D 133/00* | (2006.01) | |
| *C09D 5/00* | (2006.01) | |
| *C09D 5/02* | (2006.01) | |

(52) U.S. Cl.
CPC .......... *C09D 133/00* (2013.01); *C09D 5/002* (2013.01); *C09D 5/022* (2013.01)

(58) Field of Classification Search
CPC ....... C09D 5/002; C09D 133/00; C09D 5/022
USPC .......................................................... 524/1
See application file for complete search history.

(56) References Cited

U.S. PATENT DOCUMENTS

| | | |
|---|---|---|
| 4,857,366 A | 8/1989 | Schumacher |
| 6,156,833 A | 12/2000 | Rauls |
| 6,538,143 B1 | 3/2003 | Pinschmidt, Jr. et al. |
| 7,438,952 B2 | 10/2008 | Connelly et al. |
| 7,785,413 B2 | 8/2010 | Bortz |
| 8,076,414 B2 | 12/2011 | Power |
| 8,329,634 B2 | 12/2012 | Bortz |
| 8,337,608 B2 | 12/2012 | Bortz |
| 8,557,343 B2 | 10/2013 | Bateman et al. |
| 2003/0207121 A1 | 11/2003 | McGee |
| 2006/0099429 A1* | 5/2006 | Domes .................... C09D 4/00 428/447 |
| 2006/0233955 A1 | 10/2006 | Smith et al. |
| 2007/0014926 A1 | 1/2007 | Stricker, II et al. |
| 2009/0000549 A1 | 1/2009 | Wang et al. |
| 2010/0272883 A1 | 10/2010 | Wirz et al. |
| 2012/0152754 A1 | 6/2012 | Schlosser et al. |
| 2013/0059164 A1 | 3/2013 | Hofmann et al. |
| 2013/0071675 A1 | 3/2013 | Morris |
| 2013/0209792 A1* | 8/2013 | Power .................. C09D 123/28 428/335 |
| 2013/0266819 A1 | 10/2013 | Vonk et al. |

FOREIGN PATENT DOCUMENTS

| | | |
|---|---|---|
| EP | 0332344 A2 | 9/1989 |
| EP | 0835529 A1 | 4/1998 |
| EP | 0928820 A2 | 7/1999 |
| EP | 1167356 A2 | 1/2002 |
| EP | 1789481 A1 | 5/2007 |
| WO | WO0038844 A1 | 7/2000 |
| WO | WO2005089480 A2 | 9/2005 |
| WO | WO2006108657 A1 | 10/2006 |
| WO | WO2011142949 A1 | 11/2011 |

OTHER PUBLICATIONS

PCT IRS and Written Opinion Jul. 30, 2015.
PCT Page showing that IRS and Written Opinion were issued on Jul. 30, 2015.

* cited by examiner

*Primary Examiner* — Michael M Bernshteyn
(74) *Attorney, Agent, or Firm* — Robert W Strozier

(57) ABSTRACT

Surface pretreating additive compositions, surface pretreating compositions therefrom, surface adhesion promoting compositions, and paint compositions therefrom including an adhesion promoter system, a surfactant system, a solvent system, a solid system, a drying agent system, a crosslinking agent system, a biocide system, a UV stabilizer system, an abrasion resistance system, a wetting system, a defoaming system, and/or a paint additive system and to methods for making and using the compositions.

10 Claims, No Drawings

LOW VOC ADHESION PRETREATING AND PAINT ADDITIVE COMPOSITIONS, PRETREATING AND PAINT COMPOSITIONS THEREFROM AND METHODS OF MAKING AND USING SAME

RELATED APPLICATIONS

The present invention claims provisional priority to and the benefit of U.S. Provisional Patent Application Ser. No. 61/931,517 filed 24 Jan. 2014.

BACKGROUND OF THE INVENTION

1. Field of the Invention

Embodiments of the present invention relate to compositions including surface pretreating additive compositions, surface pretreating compositions including the surface pretreating additive compositions, surface adhesion promoting compositions, and paint compositions including the adhesion promoting composition and to methods for making and using the compositions.

More particularly, embodiments of the present invention relate to surface pretreating additive compositions, surface pretreating compositions, surface adhesion promoting compositions, and paint compositions include any combination of an adhesion promoter system, a surfactant system, a solvent system, and/or mixtures or combinations thereof. In certain embodiments, the compositions may also include a solid system, a drying agent system, a crosslinking agent system, an abrasion resistance system, a biocide system, a UV stabilizer system, a wetting system, a defoaming system, a paint additive system, and/or mixtures and combinations thereof. Embodiments of the surface pretreating compositions and paint compositions include water sufficient to prepare either a water-in-oil emulsion or microemulsion or an oil-in-water emulsion or microemulsion.

2. Description of the Related Art

In the past, alkyd, oil based paints with solvent carriers were able to reliably adhere to metal and wood. However, even oil based paints typically require that a glossy surface such as clear coat polyurethane or glossy oil based paint be pre-treated with a solvent based deglosser and/or sanding before recoating. There are Low volatile organic compound (VOC) paint deglossers on the market; however, they are often formulated with LVP solvents that require a long period of time to activate the paint and for the paint to dry completely. Water based deglossers do not work reliably on every surface. Further, the typical deglosser products on the market are not indicated to be advantageous as an additive to paints. One of the challenges of working with latex paint is to determine a reliable means of bonding the coating to a variety of surfaces. There are other products in existence, such as Emulsabond™, that claim utility as an additive that may improve paint adhesion. However, these paint additives do not suggest utility in the pretreatment of the surface to painted, either by cleaning, deglossing or priming the surface.

There are many examples of solvent based adhesion promoters that may be applied to surfaces to improve adhesion. The majority of such products are focused in the automotive coating area, due to the need to bond to metal and plastic surfaces. For example, U.S. Pat. No. 8,076,414 disclosed a solvent based blend of a polyurethane, an acrylic resin, an aromatic solvent and either divinylbenzene, isopropylpentyl-2-methyl benzyl isocyanate or an acrylic monomer. The main disadvantage of this technology is that it is solvent based, which may lead to regulatory issues in certain areas of the country as well as leading to relatively high toxicity and high flammability. In another examples, United States Published Patent Application No. 20130209792 disclosed a water based adhesion promoter for use in automotive applications, particularly for plastic parts. This product is limited in application to plastic parts and requires a significant amount of VOCs in the commercial product, presumably to maintain the polyurethane acrylic resin hybrid and the chlorinated polyolefin in solution. Neither of the commercial products stated above are suggested to be useful as a paint additive. The patent and application teach that these products are only for use as surface preparations for automotive applications.

Those skilled in the art will appreciate the ability of the adhesion promotion additive proposed in this invention as a low VOC product capable of preparing many surfaces and also working synergistically as an adhesion boosting latex paint additive. One advantage of this new product is low flammability, due in large part to the high water content in may formulas. Also, low VOCs in the formulation not only allow the product to exceed requirements for VOCs in the paint additive category, but also in the more stringent Multipurpose Solvent category for CARB and SCAQMD. The very low VOC levels of <50 g/L or even <25 g/L in some cases in these new formulations are very clear improvement over the existing technology.

Usually, preparing a surface to be painted requires a number of steps to assure successful paint adhesion. The current process generally requires cleaning the surface with soap and water, sanding, deglossing, priming with a stand-alone paint primer and then finally painting the surface. Even after all of this work, some latex paints do not adhere as well, particularly when a glossy oil based surface is not deglossed, sanded and primed adequately. Our new technology allows the user to simply wipe the surface with the proposed formula(s). The surface is allowed to dry and then painted, preferentially, with a latex paint containing an adhesion improving additive formula, which may even be the same as that used to prepare the surface.

There are a host of adhesion promoting additives known to those skilled in the art. Some broad classes of materials include, but are not limited to alkyd resins, nonionic surfactants, ionic surfactants, adhesives, polymers capable of cross linking, polymers capable of cross linking, mixtures of polymers and copolymers capable of crosslinking, block copolymers, random copolymers, polymers, functionalized polymers, etc. Many of the aforementioned materials have been shown to promote adhesion to various surfaces either alone or as a mixture of such products. EP89302087.5 disclosed a mixture of polyurethane and paratoluene sulfonic acid as a means to treat surfaces before painting as an alternative to sanding and priming, particularly to automotive windshield applications. EP1167356 A2 disclosed some improvements in wet adhesion have been observed in the use of a polymerizable monomers. U.S. Pat. No. 4,466,840 disclosed a method of pretreating surfaces to improve paint adhesion using hydroxybenzyl amines. The patent mentions that the adhesion promoter might also be added to the paint as an alternative to pretreating the surface. EP0835529 A1 suggests that pretreatment of surfaces with a low VOC water based mixture of diethanol amines, surfactants, an acrylic/polyurethane dispersion, a polyol, etc. would serve as a useful pretreatment to improve paint adhesion to various surfaces. WO2006108657A1 outlines a formula for the coating of metallic components with an aqueous organic mixture of film forming resins, cross linking agents and water. EP0928820 A2 reveals that post added wet adhesion promoters with urea compounds can improve adhesion and scrub resistance in latex paints.

WO2011142949 A1 disclosed the use of polypropylene/ethylene copolymers could be used in conjunction with alpha olefin copolymers to produce an adhesion promoter for latex paint. This patent suggests that these resins could be dispersed on surfaces in a film to promote paint adhesion. The patent describes a coating of a polypropylene adhesive as a tie layer for latex paint.

EP1789481 A1 disclosed a means to coat a plastic automobile bumper with two different solutions to better paint adhesion. This method requires two separate applications, one by wiping the surface with a solution, allowing the first coat to dry and then spraying on the second, potentially different product onto the surface. This method generally requires two separate treatments of the surface and two separate drying periods before the surface can be painted.

United States Published Patent Application 1998000554 disclosed that the addition of enamines in combination with substituted acetoacetate esters will improve the adhesion of latex paints to metal surfaces, particularly rusted metal surfaces. There was no mention of this product as a surface pretreatment. In fact, the surface of the metal was typically pretreated with Bonderite™ 1000 iron phosphate wash before painting.

United States Published Patent Application No. 2009/0005494 A1 disclosed a primer and sealer in one for composite building materials (cementitious, gypsum or other inorganic building materials). These products are described as a primer and sealer in one. The product is formulated from an acrylic latex silicate binder, an acrylic latex and urethane binder.

EP1789481 A1 disclosed a method of pretreating a plastic substrate with an adhesion promoting agent with a halogenated polyolefin that may be modified with compatibilizing agent. This method presumably requires a highly specialized halogenated polyolefin and a significant amount of organic solvents to generate the appropriate adhesion. The process appears to involve several steps to prepare the plastic surface as well, which may include cleaning, abrasion, etc.

WO2000038844 A1 disclosed a galvanized surface can be pretreated with an adhesion promoter that has at least two trialkoxysilyl groups which are bridged together by moiety that includes at least one reactive nitrogen atom. This method may require a pretreatment of the metal with an alkaline cleaner, per the claims.

WO2005089480 A2 disclosed a means to improve the adhesion of paint particularly to polyurethane by a combination of an organic solvent and an adhesion promoter. The patent teaches that organic solvents are the preferred carrier for the adhesion promoter. This method would generally result in high VOC content.

Therefore, there is a need for a product that may serve both for preparing various surfaces to be painted and functioning as an additive to improve paint adhesion.

SUMMARY OF THE INVENTION

Embodiments of the present invention provide compositions to pretreat a surface for painting and to use the same formula to add to a latex paint to further improve overall adhesion of the paint to the surface.

In certain embodiments, the adhesion promoter compositions more readily bind to a surface when it has been pretreated with the same adhesion promoter composition. The compositions are also capable of cleaning and deglossing the surface during the pretreatment step.

In certain embodiments, the methods include a one step process that cleans, deglosses and adhesively activate a surface simultaneously. In addition, the formulations are designed to be very low in Volatile Organic Compounds (VOCs).

DEFINITIONS AND ABBREVIATIONS USED IN THE INVENTION

The term "DI water" means deionized water.
The term "PCBTF" means paracholorbenzenetrifluoride.
The term "w/w" means weight/weight (percentage, usually).
The term "wt. %" means weight percent in a formulation or composition.
The term "v/v" means volume/volume (percentage, usually).
The term "vol. %" means volume percent in a formulation or composition.
The term "mL" means milliliters (unit of volume).
The term "L" means liters.
The term "g" means grams.
The term "3M" means the Minnesota Mining and Manufacturing Company.
The term "ND" means none or not detected.
The term "N/A" means not applicable.
The term "SW" means the Sherwin Williams Paint Company, 101 Prospect Avenue N.W., Cleveland, Ohio 44115.
The term "PM 200" means ProMar® 200 Paint from the SW company.
The Term "DT" means Dry Time of Paint (typically in minutes).
The Term "BSL" means Paint Brush Stroke Length (typically in centimeters).
The Term "VOC" refers to Volatile Organic Compound.
The term "Kb value" means the Kauri-butanol value an international, standardized measure of solvent power for a hydrocarbon solvent, and governed by an AS™ standardized test, ASTM D1133. The result of this test is a scaleless index, usually referred to as the "Kb value". A higher Kb value means the solvent is more aggressive or active in the ability to dissolve certain materials. Mild solvents have low scores in the tens and twenties; powerful solvents like chlorinated solvents and "High Sol 10" or "High Sol 15" (naphthenic aromatic solvents) have ratings in that are in the low hundreds.

DETAILED DESCRIPTION OF THE INVENTION

The inventors have found that low volatile organic compound (VOC) pretreating additive compositions and paint additive compositions may be formulated for pretreating surfaces, activating surfaces and/or improving surface adhesion. The inventors have also found that the pretreating additive compositions and paint additive compositions are ideally suited for the preparation of improved pretreating compositions and paint compositions, especially latex paints.

The compositions of this invention are formulated to provide to improve adhesion and abrasion resistance of latex paints on difficult surfaces, such as metal, plastic, wood, surface coated with an oil based paint, glossy clear coats, or similar coatings. The inventors have also found that a single, low VOC formula may serve to clean, degloss, and leave a priming layer that improves adhesion of subsequent coatings to the surface. The same formula may also be added to a latex paint or other coating at 0.5 wt. % to 95 wt. % loading to further improve the adhesion and abrasion resistance of the final coating on the difficult to paint surface. Typical formulas blend well with professional grades of latex paint, such as Sherwin Williams Latex A100 Exterior Glossy and Satin paints and Sherwin Williams (SW) Latex Promar 200 Zero VOC Interior Glossy and Semi-Glossy paints. These formulas will also readily clean and degloss oil based coatings and potentially deposit a compatibilizing layer of resin on the surface. An example of such a process would be to take the Adhesion Formula and then wipe it generously on an old, oil based glossy surface to be painted with a lint free rag. The rag generally picks up contaminants on the surface and visibly deglosses the surface. The adhesion formula is then left to dry on the surface for 0-24 hours, preferably 0-1 hour. A professional grade latex paint, such as SW A100 Semi-Gloss paint is then diluted with the Adhesion Formula from 0-90%, preferably 0-30%, most preferably 1.5-20% (v/v) with the Adhesion formula and mixed thoroughly. The resulting mixture can then be painted on the surface by brush, roller or sprayer. The adhesion of the paint to the surface is markedly improved over controls (no pretreatment of the surface and no additive used in the paint). The unique aspect of this formula is that it can be used both to pretreat the surface to be painted, used as an adhesion boosting additive in the paint itself and then improve the overall adhesion between the surface and the paint, presumably due to the adhesion additive bonding better to itself than the surface in question.

The pretreatment compositions improve paint adhesion to various surfaces and when coupled with paint compositions including the additive compositions further improve paint adhesion to various surfaces. Adhesion can be improved either by pretreatment of the surface with the formula or by addition of the formula directly to the paint or both. In some cases, the pretreatment of the surface with the formula, allowing the adhesion promoting formula to dry and then coating the pretreated surface with paint containing the adhesion promoting formula produced surprisingly stronger adhesion to the surface. The net result is that the same formula may be used to clean, degloss and compatibilize the targeted surface for the latex paint which may also contain some of the same adhesion promoting formula. This particular invention is unique in that the same formula may be used to clean, prepare and prime a surface to be painted and then also serve as a direct additive to the latex paint to further promote adhesion to the surface. The prepared surface and the paint containing the formula appear to have a synergistic improvement to the overall adhesion of the paint to the prepared surface. It is also extremely likely that a surface pretreated with an adhesion boosting coating would then synergistically interact with the same material in the paint applied to the same surface as a tie layer. The aforementioned approach would greatly simplify the process of painting with a latex paint by eliminating the guesswork as to whether the paint will consistently adhere to various surfaces. Therefore, there is a need for a product that may serve both for preparing various surfaces to be painted and functioning as an additive to improve paint adhesion. This need is greatest with respect to typical Latex paints, which generally suffer from poor relative adhesion, particularly to oil based paints, metals, wood, glossy clear coats, or similar coatings. However, there is a need for better surface preparations for Latex Architectural Coatings and many other coatings for single product that can both prepare a surface such as metal, wood, plastic, polymers and painted surfaces and then act as a reliable adhesion boosting latex paint additive.

The compositions are generally composed of water as one of the major ingredients. In certain embodiments, the compositions may be formulated as an oil-in-water emulsion with the aid of surfactants. In certain embodiments, the formulations may include an organic solvent system. In other embodiments, the organic solvent system may include a low vapor pressure solvent (LVP) or mixtures of LVPs. In certain embodiments, the organic solvent system comprises an exempt solvent, a mixture of exempt solvent, a LVP, a mixtures of LVPs, and mixtures or combinations thereof. In certain embodiments, the the organic solvent system comprises a mixture of exempt solvents and LVPs to assure that the paint properly coats a targeted surface.

In certain embodiments, the exempt solvent include parachlorobenzotrifluoride (PCBTF), perchloroethylene, ethyl lactate, d-limonene and mixtures or combinations thereof. In other embodiments. In certain embodiments, the solvent system may include both exempt and nonexempt solvent to affect the surface targeted for painting by swelling, deglossing, cleaning or otherwise preparing the surface to better accept another coating layer.

The organic solvent systems of this invention may also be emulsified in water using a surfactant system including a surfactant or a mixture of surfactants.

One advantageous exempt solvent may be PCBTF, which is non flammable and a good surface cleaning solvent. PCBTF is also widely known as effective coating diluent as well as a useful drying time retarder. PCBTF is known to cause swelling in a variety of resins, including, but not limited to EPDM. In addition, PCBTF is known to function as a useful primer for some roof adhesives. Firestone Corp reports higher open times with PCBTF than traditional solvents. In fact, PCBTF is known as a very good solvent for a variety of polymers. Perchloroethylene is also an exempt solvent with excellent cleaning properties and does not appreciably dissolve most polymers, which has also found utility in this area. Ethyl lactate and d-limonene are both known as excellent solvents for coatings as well as effective cleaning agents, though neither is necessarily exempt. Other solvents, both exempt and nonexempt could function of affect the surface targeted for painting by swelling, deglossing, cleaning or otherwise preparing the surface to better accept another coating layer.

In certain embodiments, the compositions may also include a variety of additives useful in preparing surfaces for recoating as well as direct addition to the latex paints to improve adhesion. Traditional alkyd resins are generally effective in these applications and are used widely to improve the adhesion of latex paints to a variety of surfaces. However, alkyd resins have the limitation of requiring long cure times and requiring expensive water based drying agents. Alkyd resins are also often yellow in color and yellow the paint according. Alkyd resins have the further disadvantage of yellowing upon aging. In addition, most alkyd resins are currently blended with traditional solvents and are relatively high in VOCs. We found a number of additives that functioned both as surface priming agents and paint adhesion boosters, which overcome the limitations of the existing art.

In certain embodiments, the compositions may include undissolved solids adapted to improve paint properties, such as abrasion, mar and impact resistance.

Compositional Ranges

| Systems | Ranges | Component | Component Purpose |
|---|---|---|---|
| Base Fluid Formulations | | | |
| Diluents | 45 vol % to 95 vol. % | aqueous solutions such as water, DI water, aqueous buffers, other aqueous solutions | aqueous phase |
| Solvent | 5 vol % to 25 vol. % | VOC exempt solvents such as para chloro benzo trifluoride (PCBTF) | organic phase |
| | | high Kb solvents such as soy methyl esters blend | organic phase leveling, retarding, high Kb solvents |
| | | biosolvents such as ethyl lactate and d-limonene | organic phase renewable solvent and masking agent |
| Surfactant | 0.5 vol. % to 3 vol. % | nonionic surfactants such as ethoxylated $C_9$-$C_{11}$ alcohols | surfactants for stabilizing the organic phase in the aqueous phase |
| Specialty Formulations | | | |
| Specialty Additive | 5 vol. % to 40 vol. % | polymers such as acetoxy capped polydimethylsiloxane copolymer | leveling, wetting and mar resistance |
| | | polymers such as poly(oxy-1,2-ethanediyl), α-[tris(1-phenylethyl)phenyl]-ω-hydroxy- | wetting and leveling agent |
| | | polymers such as acrylic/styrene copolymer solids microspheres 610 Fly Ash (sized) | in situ crosslinked adhesion promoter leveling, hardness, etc. |
| General Additive | 0.1 vol. % to 5 vol. % | defoamers | defoaming |
| | | UV stabilizers such as bis(1,2,2,6,6-pentamethyl-4-piperidyl)sebacate; Methyl 1,2,2,6,6-pentamethyl-4-piperidyl sebacate | UV stabilizer |
| | | inhibitors such as rust inhibitor, corrosion inhibitors, or other inhibitors | rust inhibition, corrosion inhibition, or other inhibitions |
| Solid System | 0.01 vol. % to 2 vol. % | solids such as methyl cellulose | thickener, emulsion stabilizer |
| | | solids such as clay | anti-settling agent |

Base Fluid Compositions

Embodiments of the base fluid compositions of this invention include:

from about 60 vol. % to about 95 vol. % of an aqueous solvent system.

from about 30 vol. % to about 5 vol. % of an organic solvent system, and from about 5 vol. % to about 0 vol. % of a surfactant system, where the weight percentages may sum to less than or greater than 100%.

Specific Base Fluid Compositions in certain embodiments, the base fluid compositions include:

from 73 vol. % to 93 vol. % of a diluent system, from 24 vol. % to 6 vol. % of a solvent system comprising:

from 70 vol. % to 50 vol. % of VOC exempt solvents such as PCBTF, from 25 vol. % to 40 vol. % of high Kb solvents such as soy methyl esters, and from 5 vol. % to 10 vol. % of biosolvents such as combinations of ethyl lactate and d-limonene, and from 3 vol. % to 1 vol. % of a surfactant system, where the weight percentages may sum to less than or greater than 100%.

in certain embodiments, the base fluid compositions include:

from 67 vol. % to 87 vol. % of a diluent system, from 30 vol. % to 12 vol. % of a solvent system comprising:

from 0 vol. % to 50 vol. % of VOC exempt solvents such as PCBTF, from 2.5 vol. % to 40 vol. % of high Kb solvents such as soy methyl esters, and from 0.5 vol. % to 10 vol. % of biosolvents such as mixtures of ethyl lactate and d-limonene, and from 3 vol. % to 1 vol. % of a surfactant system, where the weight percentages may sum to less than or greater than 100%.

General Compositions in certain embodiments, a general compositions include:
from about 85 vol. % to about 95 vol. % of a base fluid,
from about 14 vol. % to about 5 vol. % of a specialty system, and
from about 1 vol. % to about 0 vol. % of an additive system,
where the weight percentages may sum to less than or greater than 100%.

in certain embodiments, another general compositions include:
from about 61 vol. % to about 71 vol. % of a base fluid,
from about 34 vol. % to about 26 vol. % of a specialty system, and
from about 5 vol. % to about 3 vol. % of an additive system,
where the weight percentages may sum to less than or greater than 100%.

in certain embodiments, another general compositions include:
from about 60 vol. % to about 70 vol. % of a base fluid,
from about 34 vol. % to about 26 vol. % of a specialty system, and
from about 6 vol. % to about 4 vol. % of an additive system,
where the weight percentages may sum to less than or greater than 100%.

Specific Compositions

In certain embodiments, compositions of this invention including wet edge compositions including 74.24 vol. % of DI water, 8 vol. % of parachlorobenzotrifluoride (PCBTF), 4.5 vol. % of soy methyl esters, 1 vol. % of a mixture of ethyl lactate and d-limonene, 1.5 vol. % of a nonionic surfactant, 10 vol. % of a mixture of wetting agents, 0.6 vol. % of a defoamer, 0.2% of an in-can preservative, and 0.1 vol. % of a thickening agent.

In certain embodiments, compositions of this invention including oil bond compositions including 55.94 of DI water, 4.5 vol. % of soy methyl esters, 1 vol. % of a mixture of ethyl lactate and d-limonene, 1.5 vol. % of a nonionic surfactant, 30 vol. % of an adhesion promoter, 0.6 vol. % of a defoamer, 3.5 vol % of a freeze/thaw additive, and 3 vol. % of a UV stabilizer. Dow Cellocize QP 4400 H may be added at 0.7 grams/100 mL product to thicken the product.

In certain embodiments, compositions of this invention including metal bond compositions including 54.78 vol. % of DI water, 4.5 vol. % of soy methyl esters, 1 vol. % of a mixture of ethyl lactate and d-limonene, 1.5 vol. % of a nonionic surfactant, 30 vol. % of an adhesion promoter, 0.6 vol. % of a defoamer, 0.5 vol. % of a UV stabilizer, 3.5 vol. % of a freeze/thaw additive, and 3.5 vol. % of a rust inhibitor. Siltech Silsurf may also be added at 0.12 vol. % as an additional wetting agent.

In certain embodiments, compositions of this invention including hard coat compositions including 43.1 vol. % of DI water, 4.5 vol. % of soy methyl esters, 1 vol. % of a mixture of ethyl lactate and d-limonene, 1.5 vol. % of a nonionic surfactant, 10 vol. % of an adhesion promoter, 0.07 vol. % of a thickening agent, 15 vol. % of a hardening agent, 0.6 vol. % of a defoamer, 3.5% of a freeze thaw additive, 0.2% of an in-can preservative, 15% of a anti-settling agent, and 0.5 vol. % of a UV stabilizer.

In certain embodiments, compositions of this invention including dirt repelling compositions including 53.2 vol. % of DI water, 4.5 vol. % of soy methyl esters, 1 vol. % of a mixture of ethyl lactate and d-limonene, 1.5 vol. % of a nonionic surfactant, 30 vol. % of an mixed wax dispersion, 0.07 vol. % of a thickening agent, 5 vol. % of a hardening agent, 0.6 vol. % of a defoamer, 3.5% of a freeze thaw additive, 0.2% of an in-can preservative, and 0.5 vol. % of a UV stabilizer.

It should also be recognized that each composition set forth in the examples is a specific formulation of this invention.

Specialty Compositions

Embodiments of the compositions of this invention including:
from about 0 vol. % to about 100 vol. % of an adhesion promoter system,
from about 0 vol. % to about 100 vol. % of a solvent system,
from about 0 vol. % to about 50 vol. % of a surfactant system,
from about 0 vol. % to about 50 vol. % of a solid system,
from about 0 vol. % to about 50 vol. % of an abrasion resistance system,
from about 0 vol. % to about 50 vol. % of a drying agent system,
from about 0 vol. % to about 50 vol. % of a crosslinking agent system,
from about 0 vol. % to about 15 vol. % of a biocide system,
from about 0 vol. % to about 15 vol. % of a UV stabilizer system,
from about 0 vol. % to about 50 vol. % of a wetting system,
from about 0 vol. % to about 50 vol. % of a defoaming system, and
from about 0 vol. % to about 50 vol. % of a paint additive system,
where the weight percentages may sum to less than or greater than 100%.

Embodiments of the compositions of this invention including:
from about 1 vol. % to about 100 vol. % of an adhesion promoter system,
from about 1 vol. % to about 100 vol. % of a solvent system,
from about 1 vol. % to about 50 vol. % of a surfactant system,
from about 1 vol. % to about 50 vol. % of a solid system,
from about 0 vol. % to about 50 vol. % of an abrasion resistance system,
from about 0 vol. % to about 50 vol. % of a drying agent system,
from about 0 vol. % to about 50 vol. % of a crosslinking agent system,
from about 0 vol. % to about 15 vol. % of a biocide system,
from about 0 vol. % to about 15 vol. % of a UV stabilizer system,
from about 0 vol. % to about 50 vol. % of a wetting system,
from about 0 vol. % to about 50 vol. % of a defoaming system, and
from about 0 vol. % to about 50 vol. % of a paint additive system,
where the weight percentages may sum to less than or greater than 100%.

Embodiments of the compositions of this invention including:
from about 1 vol. % to about 100 vol. % of an abrasion resistance system, from about 1 vol. % to about 100 vol. % of a solvent system,
from about 1 vol. % to about 50 vol. % of a surfactant system,
from about 0 vol. % to about 100 vol. % of an adhesion promoter system,
from about 0 vol. % to about 50 vol. % of a solid system,
from about 0 vol. % to about 50 vol. % of a drying agent system,
from about 0 vol. % to about 50 vol. % of a crosslinking agent system,
from about 0 vol. % to about 15 vol. % of a biocide system,
from about 0 vol. % to about 15 vol. % of a UV stabilizer system,
from about 0 vol. % to about 50 vol. % of a wetting system,
from about 0 vol. % to about 50 vol. % of a defoaming system, and
from about 0 vol. % to about 50 vol. % of a paint additive system,
where the weight percentages may sum to less than or greater than 100%.

Embodiments of the compositions of this invention including:
from about 1 vol. % to about 50 vol. % of an adhesion promoter system,
from about 50 vol. % to about 95 vol. % of a solvent system,
from about 1 vol. % to about 15 vol. % of a surfactant system,
from about 1 vol. % to about 15 vol. % of a solid system,
from about 0 vol. % to about 50 vol. % of an abrasion resistance system,
from about 0 vol. % to about 50 vol. % of a drying agent system,
from about 0 vol. % to about 50 vol. % of a crosslinking agent system,
from about 0 vol. % to about 15 vol. % of a biocide system,
from about 0 vol. % to about 15 vol. % of a UV stabilizer system,
from about 0 vol. % to about 50 vol. % of a wetting system,
from about 0 vol. % to about 50 vol. % of a defoaming system, and
from about 0 vol. % to about 50 vol. % of a paint additive system,
where the weight percentages may sum to less than or greater than 100%.

In other embodiments, the compositions include:
from about 1 vol. % to about 50 vol. % of an abrasion resistance system,
from about 50 vol. % to about 95 vol. % of a solvent system,
from about 1 vol. % to about 15 vol. % of a surfactant system,
from about 1 vol. % to about 15 vol. % of a solid system,
from about 0 vol. % to about 50 vol. % of an adhesion promoter system,
from about 0 vol. % to about 50 vol. % of a drying agent system,
from about 0 vol. % to about 50 vol. % of a crosslinking agent system,
from about 0 vol. % to about 15 vol. % of a biocide system,
from about 0 vol. % to about 15 vol. % of a UV stabilizer system,
from about 0 vol. % to about 50 vol. % of a wetting system,
from about 0 vol. % to about 50 vol. % of a defoaming system, and
from about 0 vol. % to about 50 vol. % of a paint additive system,
where the weight percentages may sum to less than or greater than 100%.

In other embodiments, the compositions include:
from about 1 vol. % to 60 vol. % of an adhesion promoter system,
from about 1 vol. % to 40 vol. % of a solvent system,
from about 1 vol. % to 5 vol. % of a surfactant system,
from about 0 vol. % to about 30 vol. % of an abrasion resistance system,
from about 0 vol. % to 30 vol. % of a solid system,
from about 0 vol. % to 5 vol. % drying agent system,
from about 0 vol. % to 30 vol. % of a crosslinking agent system,
from about 0 vol. % to 10 vol. % of a biocide system,
from about 0 vol. % to 10 vol. % of a UV stabilizer system,
from about 0 vol. % to 30 vol. % of a wetting agent system, and
from about 0 vol. % to 10 vol. % of a defoaming agent system,
where the weight percentages may sum to less than or greater than 100%.

In other embodiments, the compositions include:
from about 1 vol. % to about 30 vol. % of an abrasion resistance system,
from about 1 vol. % to 20 vol. % of a solvent system,
from about 1 vol. % to 5 vol. % of a surfactant system,
from about 0 vol. % to 60 vol. % of an adhesion promoter system,
from about 0 vol. % to 30 vol. % of a solid system,
from about 0 vol. % to 5 vol. % drying agent system,
from about 0 vol. % to 30 vol. % of a crosslinking agent system,
from about 0 vol. % to 10 vol. % of a biocide system,
from about 0 vol. % to 10 vol. % of a UV stabilizer system,
from about 0 vol. % to 30 vol. % of a wetting agent system, and
from about 0 vol. % to 10 vol. % of a defoaming agent system,
where the weight percentages may sum to less than or greater than 100%.

Suitable Reagents and Surfaces

Surfactants

Suitable surfactants include, without limitation, nonionic surfactants, ionic surfactants, and mixtures or combinations thereof. In certain embodiments, the surfactants are alkyl phenyl ethoxylate (APE) free nonionic surfactants and/or nonionic surfactants with boiling points near to or above 216° C. to meet the current requirements of the California Air Regulatory Board (CARB). The inventors believe that this class of surfactants may improve wetting and leveling when incorporated into paint formulations directly. The APE free nonionic surfactants may also provide a means of preparing a surface for painting by cleaning the surface of residual oil, dirt, particulates, etc. However, the use of alkyl phenyl ethoxylate surfactants may provide similar benefits at a lower cost. In either case, it would be especially advantageous if the surfactants possessed a boiling point above 216° C. and/or pass CARB Method 313 to be CARB compliant. Many such surfactants are known, such as Dow Ecosurf™ EH, SA and Low Foam (LF) surfactants, Dow NP surfactants, Akzo Nobel Berol Surfactants, Air Products Carbowet 300 and Tomadol™ surfactants, Rhodia Rhodosurf 6530 and Rhodoline surfactants, and mixtures or combinations thereof. In certain embodiments, the surfactants comprise nonionic seed oil surfactants, biodegradable, nonionic seed oil surfactants, low odor nonionic, alcohol ethoxylate surfactants, biodegradable nonionic, alcohol ethoxylate surfactants, nonionic, alcohol ethoxylate surfactants, narrow range non-ionic surfactants based on a synthetic primary alcohol with >80% linearity, non-ionic surfactants based on tridecyl alcohol, biodegradable alcohol ethoxylate surfactants comprising blends of $C_8$-$C_{10}$ alcohols and $C_{14}$-$C_{16}$ alcohols and $C_9$ alcohols and $C_{11}$ alcohols, nonionic fluorinated surfactants such as Capstone™ FS-31, and mixtures or combinations thereof.

In certain embodiments, the surfactants are selected from the group consisting of Dow EcoSurf™ surfactants, Azko Nobel Berol™ surfactants, and Rhodoline surfactants or mixtures and combinations thereof. In other embodiments, the surfactants have a low VOC content and the ability to emulsify particular components in the formulas of this invention. The ability to clean surfaces to be painted is also as desired aspect.

Solvents

Suitable solvents include, without limitation, acetate solvents, ketone solvents, halogenated solvents, siloxane solvents, polysiloxane solvents, cellosolve solvents, aliphatic solvents, isoparaffin solvents, esters of dicarboxylic acid solvents, fatty acids, alkane diol solvents, hydroxy ether solvents, soy methyl ester solvents, alcohol solvents, aromatic amide solvents, alkanolamine solvents, biodegradable solvents, other low vapor pressure solvents, and mixture or combinations thereof.

Low Vapor Pressure Solvent

In certain embodiments, the LVP solvents are selected from the group consisting of CARB exempt solvents and mixtures or combinations thereof. In cerbio-derived methyl esters, fatty acids, salts of fatty acids, polysiloxanes, alkane diols, isoparaffinic solvents such as Exxon Isopar™ isoparaffin fluids, e.g., Isopar™ M, Isopar™ L and Isopar™ V, aliphatic solvents such as Calumet LVP 100, Calumet LVP 200 and Calumet LVP 300, Exxsol D 110, Exxsol D 130, and Conosol 215, ester alcohols such as Texanol™ from Eastman, glycol ethers and their derivatives, dibasic esters, similar solvents and mixtures or combinations thereof. These products generally have boiling points above 216 C and/or vapor pressures below 0.1 mm Hg. Exemplary examples include, without limitation, isoparaffinic hydrocarbon solvents, aromatic hydrocarbon solvents, glycol ethers, 1,3-butanediol, 1,4-butanediol, 1,5-pentanediol, 1-tetradecene, 2-pyrrolidone, 2-butoxy-1-propanol, 2-methyl-2,4-pentanediol, soy methyl esters, benzyl alcohol, dibasic esters, dialkyl phthalates, diethanolamine, glycol ether acetates, heavy hydrocarbon solvents (such as, Calumet LVP 100, LVP 200,), N,N'-diethyl-m-toluamide and isomers thereof (DEET), triethylene glycol, triisopropanolamine, tripropylene glycol, etc. These LVP solvents can be important in not only in meeting regulatory requirements for VOC levels, but also serve as agents to improve paint properties by promoting adhesion, retarding dry time, improving leveling, etc. These LVP solvents can also improve the ability of the formula to directly affect the surface to be painted by deglossing, improving adhesion, cleaning, swelling surface coatings, degreasing, removing loose/damaged coatings, etc.

Exemplary examples of the solvents include, without limitation, parachlorobenzotrifluoride (PCBTF), perchloroethylene (PERC), d-limonene, methyl siloxanes, ethyl lactate, glycol ethers, polyglycolethers, triethylene glycol, tripropylene glycol, triisopropanolamine, benzyl alcohol, acetone, t-butyl acetate, fluorinated alkanes, methylene chloride, tetrachloroethylene, methylated siloxanes, or mixtures and combinations thereof. Exemplary examples of glycol ethers include, without limitation, ethylene glycol monomethyl ether (2-methoxyethanol), ethylene glycol monoethyl ether (2-ethoxyethanol), ethylene glycol monopropyl ether (2-propoxyethanol), ethylene glycol monoisopropyl ether (2-isopropoxyethanol), ethylene glycol monobutyl ether (2-butoxyethanol), ethylene glycol monophenyl ether (2-phenoxyethanol), ethylene glycol monobenzyl ether (2-benzyloxyethanol), diethylene glycol monomethyl ether (2-(2-methoxyethoxy)ethanol, methyl carbitol), diethylene glycol monoethyl ether (2-(2-ethoxyethoxy)ethanol, carbitol cellosolve), diethylene glycol mono-n-butyl ether (2-(2-butoxyethoxy)ethanol), ethylene glycol dimethyl ether (dimethoxyethane), ethylene glycol diethyl ether (diethoxyethane), ethylene glycol dibutyl ether (dibutoxyethane), ethylene glycol methyl ether acetate (2-methoxyethyl acetate), ethylene glycol monoethyl ether acetate (2-ethoxyethyl acetate), ethylene glycol monobutyl ether acetate (2-butoxyethyl acetate), and mixtures or combinations thereof, polyglycolethers, triethylene glycol, tripropylene glycol, triisopropanolamine, benzyl alcohol, and mixtures or combinations thereof.

Exemplary LVP solvents include, without limitation, soy methyl esters, fatty acids, salts of fatty acids, polysiloxanes, Isopar™ M, Isopar™ L, Isopar™ V, Calumet LVP 100, Calumet LVP 200, Calumet LVP 300, Texanol™, glycol ethers and their derivatives, dibasic esters, and mixtures or combinations thereof.

Many of these compounds are considered exempt by State and Federal agencies. The organic solvents can also be selected from nonexempt products. In certain embodiments, the solvents are also non flammable, VOC exempt solvents. Some of these VOC exempt solvents may cause swelling of polymers that may lead to viscosity changes in the formula. In certain embodiments, such swelling solvents may be advantageous to the final products, by increasing the ability of the product to adhere to vertical surfaces, slower release of the solvents to allow more deglossing of the surface, more even distribution by wiping, rolling or brushing on the surface, other advantages, or mixtures and combinations thereof.

Polymers

Suitable polymers include, without limitation, epoxy polymers such as Epikote 823, polyamides such as Versamide 930, long oil alkyd (LOA), phenolic resins such as Super Beckacite 1001 and Phenodur 373U, short oil alkyd (SOA), and mixtures or combinations thereof.

Surface Priming Agents and Paint Adhesion Boosters

Suitable surface adhesion promoting additives for use in the present invention include, without limitation, (a) styrene acrylic copolymers such as Encore 7247 from Arkem and Saiden SA-207 and Sycoat 263 from STI Polymer, (b) acrylic polymers such as Saiden Sycoat 273 and Saiden X-212-263E-1 from STI Polymer, a low VOC alkyds such as Reichhold AQ-510, OPC Polymers 7536-M-70, and Rhodoline Series of Additives (e.g., 4160, 4400, 4401), (c) polyvinylchloride (PVC) polymers, (d) derivatized polyvinylchloride such as Nourybond 272 from Air Products), (e) block isocyanate polymers such as Nourybond 289, (f) maleic anhydride polymer blends such as Hardlen® EW-8511 from Advanced Polymer, Inc., (g) modified chlorinated polypropylene resins such as Hardlen® EH-801 from Advance Polymer, Inc., (h) amino functionalized silicone polymers such as KB-390 from Shin Etsu, (i) mercapto functionalized silicone polymers Shin EtsuKP-391 from Shin Etsu, (j) epoxy functionalized silicone polymers Shin Etsu KP-392 from Shin Etsu, (k) epoxy resins such as Ker 828 from Khumo P&B Chemicals, and (l) mixtures or combinations thereof.

Other suitable adhesion promoters for use in the present compositions include, without limitation, water compatiblized alkyd resins, such as OPC polymers 6502-100 and 7662-100. Some suppliers offer emulsions of alkyd resins specifically designed for aqueous applications, such as Reichhold AQ-510. Traditional alkyd resins had limitations in Low VOC emulsion applications, but these resins have lower VOCs and better water compatibility. Another type of useful adhesion promoters are acrylic resins and copolymers, particularly acrylic styrene copolymers, such as Encore 7247 from Arkema and acrylic resins such as Sycoat 263 from STI Polymer. Other copolymers based on acrylic acid and its derivatives are also expected to be advantageous in this application, similarly for copolymers of methacrylic acid and its derivatives. Partial salts of acrylic resins have also shown utility in these applications in the past. Polyisocyantes may also improve adhesion as crosslinking agents. Chlorinated polyolefins and functionalized chlorinated polyolefins are also advantageous in promoting adhesion. In addition, many wetting agents also promote the adhesion of coatings by increasing coverage of difficult to wet surfaces. Wetting agents of this sort are well known in the art with some preferred examples being modified methyl siloxanes (Silsurf® A008-UP from Siltech), Surfactant based products (Rhodoline 3100, 3300, WA 120, 2109, 4160 and 4400; Dow EcoSurf™ LF series, Berol 609A, etc.), Fluorinated Compounds (Capstone FS-81, 3M Novec Surfactants, etc.), ceramic microspheres, glass bubbles, glass beads, etc.

Solids

The aforementioned solid preferential components are typically chosen from, but not limited to Zonyl™ PTFE particles, micronized polyolefins (such as MicroPro Microspheres 400), micronized oxidized polyolefin waxes, micronized paraffin waxes, metal oxides (such as ZnO, aluminum oxide, etc.), fumed silica, calcium carbonate, ceramic microspheres (3M), glass bubbles, glass beads, rheology control agents (methylcellulose derivatives, clays, bentonites, etc.) and other solids typical to paint applications. Exemplary solid include, without limitation, a wide variety of solids that may be added to the adhesion boosting formula to further impart additional properties to the paint or assist in preparing the surface to be painted. Some typical solids are high density polyethylene (HDPE), oxides of high density polyethylene, polypropylene, ceramic beads, ceramic microparticles, glass beads, glass bubbles, silica, coated silica, calcium carbonate, chalk, paraffin waxes, polyethylene waxes, polypropylene waxes, zinc oxide, manganese oxide, Zonyl™ polytetraflouroethylene particles (PTFE), PTFE waxes, Clariant Ceridust™ line of products, PE/PTFE blends, PP Wax, Ester Wax, etc.), Clariant Licowax C (amide wax), Clariant Licocene line (Maleic Anhydride and silane grafted polyolefins), etc. It is also know to those skilled in the art that inclusion of some of these solids would aid in the cleaning and deglossing of a surface in preparation for coating the surface. One preferential example would be the inclusion of ceramic microspheres, which can impart both abrasion resistance as well as the ability to abrade a surface when rubbed on a glossy painted surface, for example.

Abrasion Resistance Additives

Suitable abrasion resistance additives include, without limitation, fluorinated abrasion resistance additives such as Dupont Capstone™ FS-81, emulsified ZnO nanoparticulate such as Buhler Oxylink Additives, dimethyldiethoxysilane abrasion resistance additives such as Soytek SG40, BASF Jonacryl 611, Troysol Z370, BASF Ekfa 3777, and ShinEtsu KBE-22, or mixtures and combinations thereof.

Drying Agents

Suitable drying agents for use in the present invention to minimize resin cure times and sometimes to increase cross linking of various resins include, without limitation, Buhler Oxylink (nanoparticles of ZnO), solutions of various Zn, Mn, Co, Zr, etc. salts designed particularly water based applications (OMG supplies many of these products).

Biocides

Suitable biocides for use in the present invention include, without limitation, low VOC, multifunctional biocides from Troy, Inc.

Rust Inhibitors

Suitable rust inhibitors for use in the present invention include, without limitation, Cortec M280, a flash rust inhibitor.

Defoaming Agents

Suitable defoaming agents are also well known in the art and those supplied by Transchemco and the Foamstar line from BASF (ST 2410) have been preferred. However, a wide variety of defoamers are anticipated to work well in this application, depending on the particular formulation.

UV Stabilizers

Suitable UV stabilizers may be necessary to assure resin stability of any given formula and those skilled in the art will be able to identify the best UV stabilizer for any given formula, though the Tinuvin line from BASF is preferred and the Tinuvin 5151, being a preferential example. Surfaces Suitable surfaces for which the pretreatment and additive compositions may be applied include, without limitation, polyurethane surfaces, lacquer surfaces, oil based paint surfaces, bare wood surfaces, aluminum surfaces, steel surfaces, glossy latex paint surfaces, plastic surfaces, other paintable surfaces, or mixtures and combinations thereof.

EXPERIMENTS OF THE INVENTION

Example 1

This example illustrates the preparation of a preteating compositions of this invention.

The formulation was prepared using 70.0 mL of water, 8.0 mL parachlorobenzotrifluoride (PCBTF), 4.5 mL Soytek 1000 E, 1.0 mL Vertec Citrus, 15.0 mL of Saiden X-212-263E-1, 1.5 mL of Berol 260 SA, and 0.1 grams of Methocell 311. The water was agitated magnetically and the Berol 260 SA and the Soytek 1000 E were slowly added. The organic components including the PCBTF, Vertec Citrus, Methocell and OPC Polymers 6502-100 were mixed in one small glass vessel. The organic components were mixed well and then added to the aqueous solution under magnetic agitation to afford an emulsion. The emulsion was agitated for 15 minutes at room temperature. The resulting emulsion was stable for more than 30 minutes.

Example 2

The example illustrates the application of the formulation of Example 1 to a coated wooden surface.

The Example 1 formulation was rubbed on a clear coated wooden surface. The product was then added at a 12% (v/v) to SW A100 Exterior Glossy Latex Paint and mixed well. The resulting mixture was then used to coat the board. The coating was allowed to cure for 2-3 days. The adhesion of the product was then tested with a Positest AT Portable Adhesion Tester using two part epoxy glue and a 20 mm dolly. The paint control had failed at 790 psi and the Example 1 product failed at 1142 psi.

Comparative Example 1

The same experiment as Example 2 was conducted using Flood Emulsabond™ per the bottle directions and the paint failed at 676 psi, which was slightly worse than the control.

Example 3

The Example 1 formulation was tested on an aged oil based surface according to the procedure of Example 2. The product did not fail in the adhesion test (the matrix failed before the paint separated). A paint control diluted with 12% (v/v) water failed at 201 psi.

Comparative Example 2

The procedure used in Example 3 was conducted using Flood Emulsabond™ at a 12% (v/v) loading and the sample failed at 64 psi.

Example 4

An abrasion resistance formulation of this invention was prepared using 81.4% of DI Water, 3.5% of Capstone™FS-81, 8.0% PCBTF, 4.5% Soytek 1000E, 1.6% Capstone™ FS-31, 1.0% Vertec Citrus and 0.15 grams of Methocell 311 and mixed as described in Example 1. The resulting emulsion was stable for at least 30 minutes.

Example 5

The formulation of Example 4 was added to SW Promar 200 Zero VOC Semi-Gloss Interior Latex paint at 12% (v/v) and mixed thoroughly. A 4 inch square of hardwood plywood coated in an oil based paint (Rustoleum Professional Enamel Product#7730 Hunter Green available from Sherwin Williams) was prepared. The sample was then abraded on a Taber Abrasor Model 5130 for 500 cycles with 50 grams on each arm of the unit (100 grams load total). The weight lost due to abrasion was 0.00248 grams.

Comparative Example 3

The paint of Example 5 was diluted with 12% (v/v) DI water and tested as above without the additive. The abrasion testing was average over three samples performed as Example 5 to afford a weight loss due to abrasion at 0.05928 grams with a significant amount of paint lost.

Latex Enhancer Formulations

Examples 6-8

Examples 6-8 are illustrative formulations of latex enhancer formulations including Soytek™ and Walwet flow and leveling agents.

TABLE 1

Examples 6-8 Formulation in Volume % or Grams

| Components | Example 6 | Example 7 | Example 8 |
|---|---|---|---|
| DI Water | 83.3 | 83.4 | 84.8 |
| PCBTF | 8 | 8 | 8 |
| Soytek ™ 1000 ES[1] | 4 | 4 | 4.5 |
| Soytek ™ 5000X-TB[1] | 1 | 1 | 0 |
| Walwet 91/040[2] | 1.5 | 1.5 | 1.5 |
| Santosol DME[3] | 1 | 1 | 0 |
| VertecBio ™ Citrus 120[4] | 1 | 1 | 1 |
| Xanthan Gum | 0.1 g | 0 | 0.1 g |
| Laponite RD[5] | 0.1 g | 0 | 0.1 g |
| Methocel 311[6] | 0 | 0.1 g | 0 |

[1]Product of Soy Technologies, LLC, 1050 Elizabeth Street, Nicholasville, Kentucky 40356
[2]Walsh & Associates, Inc.1400 Macklind Ave., St. Louis, MO 63110
[3]Cytec Industries Inc., Five Garret Mountain Plaza, Woodland Park, New Jersey 07424
[4]Vertec Biosolvents, Inc., 1441 Branding Lane, Suite 100, Downers Grove, IL 60515 USA
[5]BYK-Chemie GmbH, P.O. Box 10 02 45, 46462 Wesel, Germany
[6]The Dow Chemical Company, 2030 Willard H. Dow Center, Midland, MI 48674

All three of the products in Table 1 were prepared in the same way described below for Example 6.

Example 6

The above indicated amount of DI Water was added to a beaker along with a 1 inch Teflon™ stir bar. The DI water was then agitated using the magnetic stirrer and the Walwet Surfactant and then the Soytek™ 1000 ES were added. The Xanthan Gum and Laponite RD were then mixed into the aqueous mixture. The resulting mixture was stirred for 30 minutes. The PCBTF, Soytek™ 5000X-TB, Citrus 120, and Santosol DME were mixed in a beaker and then added to the aqueous mixture. The product formed a stable emulsion, which did not appreciably separate overnight.

Example 7

The formulation of Example 7 was prepared as Example 6, except that the Methocel 311 was added into the PCBTF, 5000X-TB, Citrus 120 and Santosol DME and then the entire mixture added into the DI Water and Walwet 91/040 mixture. The emulsion was not stable in this case and separated in less than 30 minutes

Example 8

This emulsion was prepared as Example 6 by mixing the DI Water and Walwet 91/040 with the Laponite RD and Xanthan Gum. The Soytek™ 1000 ES was mixed into the mixture next. The remaining ingredients were added as above to obtain an emulsion that was stable overnight.

Examples 9-12

Examples 9-12 illustrate latex enhancer formulations for use in flow and leveling additives with Potters Q Cels and Beckosol emulsion.

TABLE 2

Example 9-12 Formulations in Volume % or Grams

| Components | Example 9 | Example 10 | Example 11 | Example 12 |
|---|---|---|---|---|
| Solution 1 | | | | |
| DI Water | 85 | 85 | 85 | 0 |
| Berol ® 260 SA[1] | 1.5 | 1.5 | 1.5 | 1.5 |
| Soytek ™ 1000 ES | 4.5 | 4.5 | 4.5 | 4.5 |
| Solution 2 | | | | |
| VertecBio ™ Citrus I20 | 1 | 1 | 1 | 1 |
| Methocel 311 | 0.1 g | 0.1 g | 0.1 g | 0.1 g |
| PCBTF | 8 | 8 | 8 | 8 |
| Additives | | | | |
| Potters Q Cel ® 6014[2,4] | 0 | 10 | 2.5 | 0 |
| Beckosol AQ510[3] | 0 | 0 | 0 | 85 |

[1]Akzo Nobel Chemicals, LTD., 525 West Van Buren, Chicago, IL
[2]Potters Industries LLC, PO Box 841, Valley Forge, PA.
[3]Reichhold, PO Box 13582, Research Triangle Park, NC
[4]The volume of the Q Cels were neglected in the % volume calculations Example 9-12 were prepared by mixing Solution 1 ingredients together and then mixing Solution 2 ingredients together and then adding Solution 2 to Solution 1 to form an emulsion. The mixture was stirred for an hour. Example 9 produced an emulsion that was stable for about 1.5 hours. Examples 10 and 11 including Q Cels separated out of the solution to the surface after about half an hour. Example 11 had an emulsion that was stable overnight, but bore a yellowish color.

Examples 13-14

Two samples were prepared with 83.5 mL DI water, 1.5 mL Dupont™ Capstone™ FS-63, 4.5 mL Soytek™ Soyanole 1000 ES, 1.5 mL Dupont™ Capstone™ FS-83, 8 mL PCBTF and 1 mL of VertecBio™ Citrus 120 as in Example 9. Example 13 had 0.120 grams of Methocel 311 added with Solution 2. Both blends had emulsions that were stable overnight.

Example 15

Example 15 was prepared as Example 9 except with the following component composition.

TABLE 3

Example 15 Formulation in Volume % or Grams

| Components | Example 15 |
|---|---|
| Solution 1 | |
| DI Water | 85 |
| Berol ® 260 SA | 1.5 |
| Soytek ™ 1000 ES | 4.5 |
| Solution 2 | |
| VertecBio ™ Citrus I20 | 1 |
| Methocel 311 | 0.1 g |
| PCBTF | 8 |
| Additives | |
| Potters Q Cel ® 6014 | 1* |

*The volume of this solid material was neglected

Examples 16-17

Flow and leveling additives with Dow Wetting agent we were prepared as Example 4 with both emulsions stable for more than 30 minutes.

TABLE 4

Examples 16-17 Formulations in Volume % or Grams

| Components | Example 16 | Example 17 |
|---|---|---|
| Solution 1 | | |
| DI Water | 85 | 80 |
| Dow XUS20121432-34[1] | 1.5 | 6.5 |
| Soytek ™ 1000 ES | 4.5 | 4.5 |
| Solution 2 | | |
| VertecBio ™ Citrus I20 | 1 | 1 |
| Methocel 311 | 0.123 g | 0.1 g |
| PCBTF | 8 | 8 |

[1]Dow Chemical Company

Examples 18-19

These additives were prepared as Example 9 with Dow Ecosurf™ Surfactants and Elementis Nuosperse® and both emulsions stable for more than 30 minutes.

TABLE 5

Examples 18-19 Formulations in Volume % or Grams

| Components | Example 18 | Example 19 |
|---|---|---|
| Solution 1 | | |
| DI Water | 85 | 62.8 |
| Berol ® 260 SA | 1.0 | 0 |
| Ecosurf ™EH3[2] | 0 | 1 |
| Ecosurf ™ EH6[2] | 0 | 1 |
| Nuosperse ® 2006[1] | 1.5 | 0 |
| Soytek ™ 1000 ES | 4.0 | 4.0 |
| Xanthan Gum | 0 | 0.1 |
| Laponite RD | 0 | 0.1 |
| Solution 2 | | |
| VertecBio ™ Citrus I20 | 0.5 | 1 |
| OPC6502-100[2] | 0 | 20 |
| Methocel 311 | 0.12 g | 0.1 g |
| PCBTF | 8 | 10 |

[1]Product of Elementis Specialties, Inc. 329 Wyckoffs Mill Road, Hightstown, NJ 08520, USA
[2]Dow Chemical Company The mixtures were prepared as Example 9 with various soy products and a 3M™ Novec™ Fluorosurfactant. Example 20 would not form a stable emulsion. Examples 21 and 22 were both stable emulsions.

TABLE 6

Examples 20-22 Formulations in Volume % or Grams

| Components | Example 20 | Example 21 | Example 22 |
|---|---|---|---|
| Solution 1 | | | |
| DI Water | 85 | 83.5 | 82 |
| Novec ™ FC 4430[1] | 1.5 | 0 | 0 |
| Soytek ™ 5000 HS | 4.5 | 1.5 | 0 |
| Soytek ™ 1000 ES | 0 | 4.5 | 4.5 |
| Cargill Methyl Soyate[2] | 0 | 0 | 3 |
| Berol ® 260 SA | 0 | 1.5 | 1.5 |

TABLE 6-continued

Examples 20-22 Formulations in Volume % or Grams

| Components | Example 20 | Example 21 | Example 22 |
|---|---|---|---|
| Solution 2 | | | |
| VertecBio ™ Citrus I20 | 1 | 1 | 1 |
| Methocel 311 | 0.1 g | 0.1 g | 0.1 g |
| PCBTF | 8 | 8 | 8 |

[1]Produced by 3M Energy and Advanced Materials Division, 3M, Center, Building 223-6S-04, St. Paul, MN
[2]Industrial Oils & Lubricants, 12201 Torrence Avenue, Chicago, Illinois 60617

Paint Dilution and Testing of Samples

The samples in the table below were added to paint at a 15:85 ratio of the samples to the paint. The Sherwin Williams Zero VOC Pro Mar 200 Interior Latex Semi Gloss paint was then applied to an unprimed oak board with a 1 inch synthetic brush.

TABLE 7

Testing of Flow and Leveling Paint Additives

| Example | DT[1] (min) | BSL[2] (cm) | Leveling[3] | Coverage[3] | BV[4] (LV4 at 60 rpm) |
|---|---|---|---|---|---|
| 21 | 30 | 12.5 | 1 | 4 | 1180 |
| 20 | 25 | 13.0 | 4 | 4 | 1710 |
| 19 | 40 | 8.0 | 3 | 3 | 3300 |
| 14 | 34 | 9.5 | 2 | 2 | 1800 |
| 13 | <107 | 9.0 | 2 | 4 | 1870 |
| 9 | <107 | 9.5 | 4 | 4 | 1850 |
| Control 1[a] | 15 | 2.5 | 2 | 3 | 3200 |
| Control 2[b] | 10 | 8.5 | 3 | 1 | 1150 |
| 12 | ~30 | 8 | 2 | 4 | 4850 |
| 15 | ~30 | 5 | 2 | 3 | 1950 |
| 16 | ~30 | 10 | 4 | 4 | 1900 |
| 18 | ~30 | 13 | 2 | 2 | 1850 |

[1]Dry Time
[2]Brush Stroke Length
[3]Scale 1 = Poor to 5 = Excellent
[4]Brookfield Viscosity
[a]ProMar 200 Paint
[b]ProMar 200 Paint with 15 mL DI water added A drywall section was painted with ProMar 200 Zero VOC Semi-Gloss paint and then allowed to dry. A 4 inch by 3 inch section of the board was painted with 2 brush loads of paint and a single brush stroke made to test for brush stroke length. Leveling, Coverage and Gloss were visually assessed with a "1" for poor performance and a "5" for excellent performance. Each product was added at 15% v/v in the ProMar 200 interior latex semi-gloss paint.

TABLE 8

Paint Performance Testing of Flow and Leveling Agents in SW PM 200 Paint

| Example | DT[1] (min/hr) | BSL[2] (cm) | Leveling[3] | Coverage[3] | Gloss[3] |
|---|---|---|---|---|---|
| control[a] | 30 | 14.5 | 3 | 3 | 3 |
| DI Water | 21.5 | 16 | 3 | 3 | 1 |
| 9 | 40 | 26 | 4 | 4 | 4 |
| 16 | >120 | 15 | 2 | 3 | 1 |
| 18 | 40 | 22 | 3 | 4 | 4 |
| 14 | 40 | 18.5 | 4 | 4 | 4 |
| 13 | 45 | 19 | 4 | 3 | 2 |
| 19 | >1 hour | 26 | 2 | 4 | 2 |
| 21 | >1 hour | 20.5 | 4 | 3 | 4 |
| 20 | >1 hour | 38 | 3 | 4 | 4 |
| 15 | 18 | 48 | 4 | 4 | 3 |

[1]Dry Time
[2]Brush Stroke Length
[3]Scale 1 = Poor to 5 = Excellent
[a]ProMar 200 Paint Examples 23-24

In these examples the preparations were performed as Example 9 with Potters Hollow Glass Sphericel® technology and Rhodoline® 3100 nonionic wetting agent; both emulsions were stable over 30 minutes.

TABLE 9

Examples 23-24 Formulations in Volume % or Grams

| Components | Example 23 | Example 24 |
|---|---|---|
| Solution 1 | | |
| DI Water | 70 | 80 |
| Berol ® 260 SA | 1.5 | 1.5 |
| Potters 110P8CP01[1] | 15 | 0 |
| Rhodoline 3100[2] | 0 | 5.0 |
| Soytek ™ 1000 ES | 4.5 | 4.5 |
| Solution 2 | | |
| VertecBio ™ Citrus I20 | 1.0 | 1.0 |
| Methocel 311 | 0.1 g | 0.1 g |
| PCBTF | 8 | 8 |

[1]The Potters Sphericel ® 110P8 was supplied by Potters Industries, PO Box 841 Valley Forge, PA 19482 USA
[2]Solvay USA, Inc., Novecare, CN 7500, 8 Cedar Brook Dr., Cranbury, NJ, 08512-7500

Examples 25-27

In these examples the preparations were performed as Example 9 with a series of Rhodoline® wetting and leveling agents. The emulsions were stable over 30 minutes.

TABLE 10

Examples 25-27 Formulations in Volume % or Grams

| Components | Example 25 | Example 26 | Example 27 |
|---|---|---|---|
| Solution 1 | | | |
| DI Water | 79.5 | 79.5 | 79.5 |
| Berol ® 260 SA | 2 | 2 | 2 |
| Rhodoline ® 3300[1] | 5 | 0 | 0 |
| Rhodoline ® 4160[1] | 0 | 5 | 0 |
| Rhodoline ® 4400[1] | 0 | 0 | 5 |
| Soytek ™ 1000 ES | 4.5 | 4.5 | 4.5 |
| Solution 2 | | | |
| VertecBio ™ Citrus I20 | 1.0 | 1.0 | 1.0 |
| Methocel 311 | 0.1 g | 0.1 g | 0.1 g |
| PCBTF | 8 | 8 | 8 |

[1]Solvay USA, Inc., Novecare, CN 7500, 8 Cedar Brook Dr., Cranbury, NJ, 08512-7500

Examples 28-30

In these examples the preparations were performed as Example 9 with Fatty Acids, a Shinestu Silicone wetting agent and Dupont Zonyl® PTFE powder additive and the emulsions were stable over 30 minutes.

TABLE 11

Examples 28-30 Formulations in Volume % or Grams

| Components | Example 28 | Example 29 | Example 30 |
|---|---|---|---|
| Solution 1 | | | |
| DI Water | 79.5 | 80 | 85 |
| Berol ® 260 SA | 2 | 1.5 | 1.5 |
| Distilled Tallow Fatty Acid[1] | 5 | 0 | 0 |
| Shinestu KBE-22[2] | 0 | 5 | 0 |
| Zony ® MP1200[3] | 0 | 0 | 2.5 g |
| Soytek ™ 1000 ES | 4.5 | 4.5 | 4.5 |
| Solution 2 | | | |
| VertecBio ™ Citrus I20 | 1.0 | 1.0 | 1.0 |
| Methocel 311 | 0.1 g | 0.1 g | 0.1 g |
| PCBTF | 8 | 8 | 8 |

[1]ACME HARDESTY COMPANY, 450 Sentry Parkway, Blue Bell, PA 19422
[2]Shin-Etsu Silicones of America, Inc., 1150 Damar Dr., Akron, OH 44305
[3]DuPont Fluoroproducts, P.O. Box 80713, Wilmington, DE 19880-0713

Examples 31-32

In these examples the preparation was performed as Example 9 with Dupont and 3M fluorosurfactants and emulsions were stable over 30 minutes without any additional surfactant.

TABLE 12

Examples 31-32 Formulations in Volume % or Grams

| Components | Example 31 | Example 32 |
|---|---|---|
| Solution 1 | | |
| DI Water | 83.5 | 81.5 |
| Berol ® 260 SA | 0 | 0 |
| Capstone ® FS 31[1] | 3 | 0 |
| Novec ™ FC 4430[2] | 0 | 5 |
| Soytek ™ 1000 ES | 4.5 | 4.5 |
| Solution 2 | | |
| VertecBio ™ Citrus I20 | 1 | 1 |
| Methocel 311 | 0.1 g | 0.1 g |
| PCBTF | 8 | 8 |

[1]DuPont Fluoroproducts, P.O. Box 80713, Wilmington, DE 19880-0713Valley Forge, PA 19482 USA
[2]3M Energy and Advanced Materials Division, 3M Center, Building 223-6S-04, St. Paul, MN 55144

The products were tested on a primed sheet of dry wall using paint diluted 15% (v/v) with the additive in Sherwin Williams A-100 Flat Exterior Latex Paint (White Base). A 4 inch by 3 inch section of the primed drywall section was painted with 2 brush loads of paint and a single brush stroke made to test for brush stroke length. Leveling and Coverage were visually assessed with a "1" for poor performance and a "5" for excellent performance.

TABLE 13

Testing of Paint Additives for Flow and Leveling in SW A-100 Flat Exterior Paint

| Product in A-100 Paint (15 vol. %) | DT[1] (min) | BSL[2] (cm) | Leveling[3] | Coverage[3] |
|---|---|---|---|---|
| None (Control) | 25 | 14 | 2 | 3.5 |
| DI Water | 25 | 24.5 | 3 | 1 |
| Example 23 | 35 | 37 | 2.5 | 1 |
| Example 16 | 37 | 24.5 | 3 | 4 |
| Example 22 | 28 | 18.5 | 3 | 2 |
| Example 21 | 35 | 37 | 2 | 2 |
| DI Water | 17 | 17.5 | 1 | 2 |
| Example 9 | 30 | 18 | 1 | 2 |
| Example 24 | 50 | 25 | 2 | 2.5 |
| Example 25 | 50 | 30 | 2.5 | 2.5 |
| Example 27 | 38 | 16 | 2 | 2 |
| Example 26 | 38 | 18 | 1 | 1 |
| DI Water | 30 | 22 | 2.5 | 3 |
| Example 31 | <30 | 21 | 2 | 1.5 |
| Example 28 | <32 | 38 | 3 | 2 |
| Example 29 | 37 | 17 | 3 | 2 |
| Example 30 | 37 | 28 | 3 | 2 |
| Control[a] | 45 | 7.5 | 2.5 | 3 |
| DI Water | <25 | 10.5 | 2.5 | 2 |
| Example 23 | >45 | 25 | 3 | 3 |
| Example 17 | 45 | 15.5 | 3 | 3 |
| Example 22 | 45 | 18.5 | 4 | 4 |
| Example 21 | >45 | 19 | 3 | 3 |
| Example 9 | <25 | 15 | 3 | 2 |
| Example 25 | <25 | 17 | 3.5 | 4 |
| Example 26 | <25 | 22 | 3 | 3 |
| Example 27 | <25 | 15 | 4 | 3 |
| DI Water | <25 | 16 | 2.5 | 2.5 |
| Example 31 | <25 | 14 | 4 | 4 |
| Example 28 | <25 | 14 | 3.5 | 3.5 |
| Example 29 | <25 | 26 | 4 | 4 |
| Example 30 | <25 | 14.5 | 3.5 | 4 |
| Example 31 | <25 | 16 | 4.5 | 4 |

[1]Dry Time
[2]Brush Stroke Length
[3]Scale 1 = Poor to 5 = Excellent
[a]A-100 Paint

Examples 33-36

In these examples the preparation was performed as Example 9. The emulsions were stable over 30 minutes, except for Example 33, which had separation in a few minutes. Another 0.5% Berol® 260 SA did not stabilize the blend. Preparation of paint additives for flow and leveling with Siltech Silicone Surfactants and Rhodoline® Open Time Extender additives.

TABLE 14

Examples 33-36 Formulations in Volume % or Grams

| Components | Example 33 | Example 34 | Example 35 | Example 36 |
|---|---|---|---|---|
| Solution 1 | | | | |
| DI Water | 79.5 | 80 | 80 | 75 |
| Berol ® 260 SA | 2.0 | 1.5 | 1.5 | 1.5 |
| Soytek ™ 1000 ES | 4.5 | 4.5 | 4.5 | 4.5 |
| Solution 2 | | | | |
| Siltech C-404[1] | 5 | 0 | 0 | 0 |
| Silsurf ® A004-UP[1] | 0 | 5 | 0 | 0 |
| Silsurf ® A008-UP[1] | 0 | 0 | 5 | 0 |
| Rhodoline ® OTE-500[2] | 0 | 0 | 0 | 10 |

TABLE 14-continued

Examples 33-36 Formulations in Volume % or Grams

| Components | Example 33 | Example 34 | Example 35 | Example 36 |
|---|---|---|---|---|
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]Siltech Corporation 225 Wicksteed Avenue Toronto, Ontario, Canada, M4H 1G5
[2]Rhodia, Inc., Rhodia Novacare, CN 7500, 8 Cedar Brook Dr., Cranbury, NJ 08512

A drywall board was primed with Valspar PVA latex primer and then each product sample used to dilute Sherwin Williams A-100 Flat Latex Exterior Paint at 15 vol. %. A 4 inch by 3 inch section of the primed drywall section was painted with 2 brush loads of paint and a single brush stroke made to test for brush stroke length. Leveling and Coverage were visually assessed with a "1" for poor performance and a "5" for excellent performance.

TABLE 15

Paint Testing of Flow and Leveling Additive in SW A-100 Exterior Paint

| Product in A-100 Paint (15 vol. %) | $DT^1$ (min) | $BSL^2$ (cm) | Leveling[3] | Coverage[3] |
|---|---|---|---|---|
| DI Water* | 5.5 | 35 | 3 | 4 |
| Example 22* | 6.4 | 38 | 4 | 4 |
| Example 23* | 3.4 | 36 | 4 | 5 |
| Example 28* | 7.2 | 31 | 5 | 3.5 |
| Example 29* | 7.4 | 16 | 2 | 3 |
| Example 30* | 7 | 15 | 3 | 3.5 |
| DI Water* | 4.6 | 35 | 3 | 4 |
| Example 24 | 4.6 | 38 | 2 | 3 |
| Example 25 | 6.4 | 36 | 2 | 2 |
| Example 32 | 5.2 | 36 | 3.5 | 4 |
| Example 33 | 5.4 | 27 | 2 | 3 |
| Example 34 | 5 | 22 | 2 | 2 |
| Control[a] | <5 | 20 | 3 | 5 |
| DI Water | <5 | 26 | 2 | 2.5 |
| Example 35 | <5 | 24 | 2 | 2 |
| Example 36 | >5 | 35 | 2 | 2 |

[1]Dry Time
[2]Brush Stroke Length
[3]Scale 1 = Poor to 5 = Excellent
*These paint samples were loaded more heavily with paint (experiment shift in apparent performance)
[a]A100 Paint A primed and painted drywall board was top coated with Valspar Ultra Premium Exterior Semi Gloss white latex paint (19910) with severe weather protection. The paint was allowed to cure 4 hours minimum. Americas Finest 100% Exterior Flat paint with brown pigment was then diluted 15% v/v with the product and mixed well. A 4 inch by 3 inch section of the primed drywall section was painted with 2 brush loads of paint and a single brush stroke made to test for brush stroke length. Leveling and Coverage were visually assessed with a "1" for poor performance and a "5" for excellent performance.

TABLE 16

Testing of Flow and Leveling Agents in America's Finest Flat Exterior Paint

| | $DT^1$ (min) | $BSL^2$ (cm) | Leveling[3] | Coverage[3] |
|---|---|---|---|---|
| Product in Americas Finest Paint (15 vol. %) | | | | |
| DI Water | 90 | 8.5 | 2.5 | 4 |
| Example 23 | 105 | 24 | 3.5 | 3 |
| Example 24 | 120 | >42 | 2 | 3 |
| Example 35 | 120 | 36 | 3.5 | 2 |
| Example 28 | 105 | 35 | 4.5 | 2.5 |
| Example 30 | 120 | 6 | 3.5 | 3 |
| Example 36 | 120 | 37 | 3 | 3.5 |
| Product in SW ProMar ® 200 Zero VOC Paint | | | | |
| A100 Control | <25 | 17 | N/A | 4 |
| DI Water | <25 | 19 | N/A | 4 |
| Example 23 | <25 | 24.5 | N/A | 4 |
| Example 24 | <25 | 28 | N/A | 4 |
| Example 22 | <25 | 31.5 | N/A | 4 |
| Example 35 | <25 | 8.5 | N/A | 4 |
| Example 36 | <25 | 13 | N/A | 4 |
| Example 28 | <25 | 24 | N/A | 4 |

[1]Dry Time
[2]Brush Stroke Length
[3]Scale 1 = Poor to 5 = Excellent

Examples 37-40

In these examples the preparation was performed as Example 9 with combinations of wetting and leveling additives; the emulsions were stable over 30 minutes, except for Example 37, which had separation in a few minutes.

TABLE 17

Examples 37-40 Formulations in Volume % or Grams

| Components | Example 37 | Example 38 | Example 39 | Example 40 |
|---|---|---|---|---|
| Solution 1 | | | | |
| DI Water | 75 | 77 | 80 | 75 |
| Berol ® 260 SA | 1.5 | 1.5 | 1.5 | 1.5 |
| Soytek ™ 1000 ES | 4.5 | 4.5 | 4.5 | 4.5 |
| Solution 2 | | | | |
| Silsurf ® A008-UP[1] | 0 | 0 | 0 | 5 |
| Rhodoline OTE-500[2] | 10 | 0 | 0 | 0 |
| Sphericel 110P8[3] Tapped Volume[7] | 15 | 0 | 15 | 0 |
| Fatty Acids[4] | 0 | 5 | 0 | 5 |
| Methyl Soyate[5] | 0 | 3 | 0 | 0 |
| Novec F4430[6] | 0 | 0 | 5 | 0 |
| VertecBio ™ *Citrus* I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]Siltech Corporation 225 Wicksteed Avenue Toronto, Ontario, Canada, M4H 1G5
[2]Rhodia, Inc., Rhodia Novacare, CN 7500, 8 Cedar Brook Dr., Cranbury, NJ 08512
[3]Potters Industries LLC, PO Box 841, Valley Forge, PA.
[4]Acme Hardesty Company, 450 Sentry Parkway, Blue Bell, PA 19422
[5]Industrial Oils & Lubricants, 12201 Torrence Avenue, Chicago, Illinois 60617
[6]Produced by 3M Energy and Advanced Materials Division, 3M, Center, Building 223-6S-04, St. Paul, MN
[7]Volume not included for % volume calculations.

Example 41

In one container, 75 mL of DI Water, 1.5 mL Berol® 260SA and 4.5 mL Soyanol 1000 ES were mixed well. To this mixture was added 10 mL of Rhodoline WA 120. A mixture of 1 mL of Vertec Citrus 120, 8 mL of PCBTF and 0.1 gram of Methocel 311 was then added to the aqueous mixture to form an emulsion that was stable for 30 minutes.

Examples 42-48

These formulas were water based with the following additives used at the specified volumes and filled to 100 mL total volume with water. The mixtures were agitated for 30 minutes.

Example 42

Added 2.5 mL of Rhodoline® OTC-500 and 2.5 mL of WA-120.

Example 43

Added 10 mL of OTC-500 and 2.5 mL of Rhodia WA-120.

Example 44

Added 10 mL of Cargil Methyl Soyate and 4 mL of Rhodia WA-120 which formed a weak emulsion with water.

Example 45

Added 10 mL of Soyanol 1000 ES and 4 ml of Rhodia WA-120, which formed a weak emulsion with water.

Example 46

Added 7 mL of Worleedadd 351 (Worlee-Chemie GmbH, GrusonstraBe 22 D-22113 Hamburg)

Example 47

Added 5 mL of BYK 307 (BYK-Chemie GmbH, P.O. Box 10 02 45, 46462 Wesel, Germany)

Example 48

Added 5 mL of BYK 3455 (BYK-Chemie GmbH, P.O. Box 10 02 45, 46462 Wesel, Germany) and the emulsion was weak and failed in the 30 minute stability test.

Example 49

Added 5 mL of Capstone® 31 (DuPont Fluoroproducts, P.O. Box 80713, Wilmington, Del. 19880-0713). This mixture formed a weak emulsion, which failed fairly quickly.

A drywall board was coated with Kiltz Latex Primer (White/Gray Tinted). Sherwin Williams ProMar 200 Zero VOC Semi-Gloss Latex paint was diluted with 15% v/v with the product and mixed well. A 4 inch by 3 inch section of the primed drywall section was painted with 2 brush loads of paint and a single brush stroke made to test for brush stroke length. Leveling and Coverage were visually assessed with a "1" for poor performance and a "5" for excellent performance.

TABLE 18

Paint Testing of Flow and Leveling Additives in SW PM 200 Semi-Gloss Paint

| Product in PM200 Zero VOC Semi Gloss Paint | $DT^1$ (min) | $BSL^2$ (cm) | Leveling[3] | Coverage[3] |
|---|---|---|---|---|
| DI Water | 20 | 35 | 4 | 3 |
| Example 42 | 26 | 26 | 5 | 4 |
| Example 43 | <60 | 40 | 4 | 5 |
| Example 46 | <60 | 21.5 | 4 | 4 |
| Example 47 | <60 | 36 | 4 | 3.5 |
| Example 48 | <60 | 32 | 4 | 5 |
| Example 49 | <20 | 28.5 | 3 | 4 |
| Example 30 | <60 | 36 | 3 | 3 |
| Example 36 | <60 | 38.5 | 4 | 4 |
| Example 32 | <60 | 27 | 4 | 5 |
| Example 22 | 60 | 36.5 | 3 | 2 |

[1]Dry Time
[2]Brush Stroke Length
[3]Scale 1 = Poor to 5 = Excellent

Examples 50-54

In these examples 80 mL of water, 1.5 mL of Berol® 260 SA and 4.5 mL of Soyanol 1000 ES were mixed. The additive products below were used at 5 mL each, except for the OTE-500, with 1 mL Vertec Citrus 120, 8 mL of PCBTF and 0.1 g of Methocel 311 and mixed well. The two solutions were mixed well to produce an emulsion that was stable for at least 30 minutes.

Example 50

Elka 3772 (BASF Corporation, 100 Park Avenue, Florham Park, N.J. 07932, USA). Eliminated based on odor.

Example 51

BASF Jonacryl 1532

Example 52

Rhodoline® 2109 (Rhodia)

Example 53

Rhodoline® 5520

Example 54

Rhodoline® OTE-500 used 10 mL instead of 5 mL.

Examples 55-58

In these examples the preparation of leveling and wetting agents was performed as Example 9. The Zonyl® and Sphericel® products were considered to occupy negligible volumes as solids.

TABLE 19

Examples 55-58 Formulations in Volume % or Grams

| Product (vol. %, v/v) | Example 55 | Example 56 | Example 57 | Example 58 |
|---|---|---|---|---|
| Solution 1 | | | | |
| DI Water | 81.5 | 80 | 75 | 77.5 |
| Berol ® 260 SA | 0 | 1.5 | 1.5 | 0 |
| Soytek ™ 1000 ES | 4.5 | 4.5 | 4.5 | 4.5 |
| Solution 2 | | | | |
| Silsurf ® A008-UP[1] | 0 | 5 | 5 | 5 |
| Rhodoline ® 3100[2] | 5 | 0 | 5 | 0 |
| Sphericel 110P8CP01[3] | 10 | 0 | 0 | 0 |
| Zonyl ® MP 1200[4] | 0 | 5 | 0 | 0 |
| Novec ™ FC-4430[5] | 0 | 0 | 0 | 5 |
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]Siltech Corporation 225 Wicksteed Avenue Toronto, Ontario, Canada, M4H 1G5
[2]Rhodia, Inc., Rhodia Novacare, CN 7500, 8 Cedar Brook Dr., Cranbury, NJ 08512
[3]The Potters Sphericel ® 110P8 was supplied by Potters Industries, PO Box 841
[4]DuPont Fluoroproducts, P.O. Box 80713, Wilmington, DE 19880-0713
[5]Produced by 3M Energy and Advanced Materials Division, 3M, Center, Building 223-6S-04, St. Paul, MN A drywall board was coated with Sherwin Williams Multipurpose Primer (White/Gray Tinted). Sherwin Williams A-100 Exterior Satin Latex paint was diluted with 15% v/v with the product and mixed well. A 4 inch by 3 inch section of the primed drywall section was painted with 2 brush loads of paint and a single brush stroke made to test for brush stroke length. Leveling and Coverage were visually assessed with a "1" for poor performance and a "5" for excellent performance.

TABLE 20

Paint Testing of Flow and Leveling Additives in SW A-100 Satin Exterior Paint

| Product in A100 Paint (15 vol. %) | DT[1] (min) | BSL[2] (cm) | Leveling[3] | Coverage[3] |
|---|---|---|---|---|
| Average DI Water* | 12 | 25.5 | 2 | 2 |
| Average Paint (control)* | 12.5 | 22 | 2.3 | 2 |
| Example 53 | 10 | 29.5 | 1 | 1 |
| Example 54 | 16 | 24 | 1.5 | 1.5 |
| Example 50 | 13 | 19 | 2 | 2 |
| Example 58 | 11 | 32 | 1.5 | 1.5 |
| Example 55 | 11 | 29.5 | 2.5 | 2.5 |
| Example 51 | 15 | 23.5 | 2 | 3 |
| Example 55 | 14 | 32 | 2.5 | 2.5 |
| Example 56 | 14 | 24.5 | 2.5 | 3 |
| Example 57 | 17 | 30 | 3 | 3 |
| Klean Strip Smooth Finishes ™[a] | 13 | 21 | 2 | 1.5 |
| XIM Latex Extender ™[b] | 10 | 17 | 2 | 2.5 |
| Flood Floetrol ®[c] | 10 | 30 | 2 | 2.5 |
| Sterling Thin-X ®[c] | 9 | 27.5 | 2 | 2 |

[1]Dry Time
[2]Brush Stroke Length
[3]Scale 1 = Poor to 5 = Excellent
*Added as directed on the label
[a]Akzo Nobel Paints 15885 Sprague Road Strongsville, Ohio 44136
[b]The Savogran Co.; P.O. Box 130, Norwood, MA 02062
[c]W. M. Barr, 2105 Channel Avenue, Memphis, TN 38113

A Graco™ Spraystation 3900 was loaded with 8 ounces of Sherwin Williams A-100 Satin Exterior Latex paint diluted with 20% (v/v) with the product. The commercial products were used as directed. A score of "1" indicates very poor performance and a score of "5" indicates excellent performance.

TABLE 21

Air Sprayer Testing of the Flow and Leveling Additives with SW A-100 Satin Exterior Paint

| Product | Dry Time (min) | Sprayability | Leveling | Coverage | Comments |
|---|---|---|---|---|---|
| DI Water | 120 | 1 | 1 | 2 | Pinholes formed |
| Example 53 with 1% of DC2210** | 120 | 3 | 2.5 | 3 | Very even application |
| XIM Latex Extender ™* | 103 | 2 | 1.5 | 2 | Some Pinholes |
| Klean Strip Smooth Finishes ™* | 100 | 1 | 1 | 1 | Uneven application |
| Flood Floetrol ®* | 105 | 2 | 2 | 2.5 | A little uneven application |

*Added as directed on the label
**Dow Corning Anti-foam 2210 from Dow Corning Corporation, South Saginaw Road, Midland, Michigan 48686.

Examples 59-62

In these examples the bonding additive preparation was performed as Example 9 with Soytek SG40 resin system and the emulsions were stable over 30 minutes.

TABLE 22

Examples 59-62 Formulations in Volume % or Grams

| Components | Example 59 | Example 60 | Example 61 | Example 62 |
|---|---|---|---|---|
| Solution 1 | | | | |
| DI Water | 80 | 75 | 70 | 55 |
| Berol ® 260 SA | 1.5 | 1.5 | 1.5 | 1.5 |
| Soytek ™ 1000 ES | 4.5 | 4.5 | 4.5 | 4.5 |

TABLE 22-continued

Examples 59-62 Formulations in Volume % or Grams

| Components | Example 59 | Example 60 | Example 61 | Example 62 |
|---|---|---|---|---|
| Solution 2 | | | | |
| Soytek ™ SG40[1] | 5 | 10 | 15 | 30 |
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]Product of Soy Technologies, LLC, 1050 Elizabeth Street, Nicholasville, Kentucky 40356

Examples 63-66

In these examples the bonding additive preparation was performed as Example 9 with Reichhold Beckosol AQ® 510 hybrid latex and the emulsions were stable over 30 minutes.

TABLE 23

Examples 63-66 Formulations in Volume % or Grams

| Components | Example 63 | Example 64 | Example 65 | Example 66 |
|---|---|---|---|---|
| Solution 1 | | | | |
| DI Water | 80 | 75 | 70 | 55 |
| Berol ® 260 SA | 1.5 | 1.5 | 1.5 | 1.5 |
| Soytek ™ 1000 ES | 4.5 | 4.5 | 4.5 | 4.5 |
| Solution 2 | | | | |
| Reichhold AQ ® 510[1] | 5 | 10 | 15 | 30 |
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]Reichhold, PO Box 13582, Research Triangle Park, NC

Examples 67-70

In these examples the bonding additive preparation was performed as Example 9 with Arkema Encor™ 7247 metal crosslinked copolymer emulsion and the emulsions were stable over 30 minutes.

TABLE 24

Examples 67-70 Formulations in Volume % or Grams

| Components | Example 67 | Example 68 | Example 69 | Example 70 |
|---|---|---|---|---|
| Solution 1 | | | | |
| DI Water | 80 | 75 | 70 | 55 |
| Berol ® 260 SA | 1.5 | 1.5 | 1.5 | 1.5 |
| Soytek ™ 1000 ES | 4.5 | 4.5 | 4.5 | 4.5 |
| Solution 2 | | | | |
| Encor ® 7247[1] | 5 | 10 | 15 | 30 |
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]Arkema Coating Resins, 410 Gregson Dr., Cary, NC 27511

A plywood board was cleaned with Crown Pro Clean Up™ (Packaging Service Co., 1904 Mykawa Rd, Pearland, Tex. 77581). Each product was used to dilute Sherwin Williams ProMar 200 Zero VOC Interior Semigloss Latex Paint at 15% (v/v). The paint mixtures were then applied to the plywood directly with a 1 inch synthetic brush fairly thickly (~6-8 mils). A quick screening of adhesion was conducted using Gorilla Tape Camo Duct Tape (UPC052427601094) which was applied to the paint after curing two days and then strips pulled up every hour for a total of four hours. Leveling and Coverage were subjectively rated on a scale with 1=Poor performance and 5=Excellent performance.

TABLE 25

Paint and Adhesion Testing of Bonding Paint Additives in SW PM 200 Paint

| Product | Leveling[1] | Coverage[1] | Time of significant failure from pull test |
|---|---|---|---|
| Paint (Control) | 3 | 4 | 3 hours |
| DI Water | 3 | 2 | Did not fail |
| Example 54 | 3 | 3 | Did not fail |
| Example 55 | 4 | 3 | Did not fail |
| Example 56 | 3 | 4 | Did not fail |
| Example 57* | 3 | 3 | 4 hours |
| Example 58 | 3 | 2 | Did not fail |
| Example 59 | 3 | 4 | Did not fail |
| Example 60 | 3 | 3 | Did not fail |
| Example 61 | 3 | 3 | Did not fail |
| Example 62 | 2 | 2 | Did not fail |
| Example 63 | 3 | 2 | Did not fail |
| Example 64 | 3 | 2 | Did not fail |
| Example 65* | 4 | 4 | 4 Hours |
| Flood Floetrol ® 5%* | 3.5 | 4.5 | 3 hours |
| Flood Floetrol ® 10%* | 4.5 | 4 | 2 hours |
| Flood Floetrol ® 15%* | 3 | 3 | 2 hours |
| Flood Floetrol ® 30%* | 4 | 4 | 1 hour (heavy failure at 2 hours) |

[1]Scale 1 = Poor to 5 = Excellent
*Two days may not be sufficient cure time due to dry/cure time extension

Examples 71-74

In these examples the bonding additive preparation was performed as Example 9 with Troysol™ ZLAC zero VOC wetting additive and the emulsions were stable over 30 minutes.

TABLE 26

Examples 71-74 Formulations in Volume % or Grams

| Components | Example 71 | Example 72 | Example 73 | Example 74 |
|---|---|---|---|---|
| Solution 1 | | | | |
| DI Water | 84 | 82.5 | 80 | 75 |
| Berol ® 260 SA | 1.5 | 1.5 | 1.5 | 1.5 |
| Soytek ™ 1000 ES | 4.5 | 4.5 | 4.5 | 4.5 |
| Solution 2 | | | | |
| Troysol ™ ZLAC[1] | 1 | 2.5 | 5 | 10 |
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]Troy Corp., 8 Vreeland Rd., Florham Park, NJ 07932

Examples 75-78

In these examples the bonding additive preparation was performed as Example 9 with Troysol™ LAC wetting agent. The emulsions were stable over 30 minutes.

TABLE 27

Examples 70-73 Formulations in Volume % or Grams

| Components | Example 75 | Example 76 | Example 77 | Example 78 |
|---|---|---|---|---|
| Solution 1 | | | | |
| DI Water | 84 | 82.5 | 80 | 75 |
| Berol ® 260 SA | 1.5 | 1.5 | 1.5 | 1.5 |
| Soytek ™ 1000 ES | 4.5 | 4.5 | 4.5 | 4.5 |
| Solution 2 | | | | |
| Troysol ™ LAC[1] | 1 | 2.5 | 5 | 10 |
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]Troy Corp., 8 Vreeland Rd., Florham Park, NJ 07932

Examples 79-82

In these examples the bonding additive preparation was performed as Example 9 with Rhodoline® 4160 anionic wetting and dispersing agent. The emulsions were stable over 30 minutes.

TABLE 28

Examples 79-82 Formulations in Volume % or Grams

| Components | Example 79 | Example 80 | Example 81 | Example 82 |
|---|---|---|---|---|
| Solution 1 | | | | |
| DI Water | 84 | 82.5 | 80 | 75 |
| Berol ® 260 SA | 1.5 | 1.5 | 1.5 | 1.5 |
| Soytek ™ 1000 ES | 4.5 | 4.5 | 4.5 | 4.5 |
| Solution 2 | | | | |
| Rhodoline 4160[1] | 1 | 2.5 | 5 | 10 |
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]Rhodia, Inc., Rhodia Novacare, CN 7500, 8 Cedar Brook Dr., Cranbury, NJ 08512

Examples 83-86

In these examples the bonding additive preparation was performed as Example 9 with Rhodoline 4400 anionic surfactant and the emulsions were stable over 30 minutes.

TABLE 29

Examples 83-86 Formulations in Volume % or Grams

| Product (vol. %) | Example 83 | Example 84 | Example 85 | Example 86 |
|---|---|---|---|---|
| Solution 1 | | | | |
| DI Water | 84 | 82.5 | 80 | 75 |
| Berol ® 260 SA | 1.5 | 1.5 | 1.5 | 1.5 |
| Soytek ™ 1000 ES | 4.5 | 4.5 | 4.5 | 4.5 |
| Solution 2 | | | | |
| Rhodoline 4400[1] | 1 | 2.5 | 5 | 10 |
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]Rhodia, Inc., Rhodia Novacare, CN 7500, 8 Cedar Brook Dr., Cranbury, NJ 08512

Examples 87-90

In these examples the bonding additive preparation was performed as Example 9 with Polychem 6502-100 long oil alkyd and the emulsions were stable over 30 minutes.

TABLE 30

Examples 87-90 Formulation in Volume % or Grams

| Components | Example 87 | Example 88 | Example 89 | Example 90 |
|---|---|---|---|---|
| Solution 1 | | | | |
| DI Water | 80 | 75 | 70 | 55 |
| Berol ® 260 SA | 1.5 | 1.5 | 1.5 | 1.5 |
| Soytek ™ 1000 ES | 4.5 | 4.5 | 4.5 | 4.5 |
| Solution 2 | | | | |
| Polychem 6502-1200[1] | 5 | 10 | 15 | 30 |
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]OPC Polymers, 1920 Leonard Avenue, Columbus, OH 43219

Examples 91-94

In these examples the bonding additive preparation was performed as Example 9 with Polychem 7536-M-70 long oil soya alkyd. The emulsions were stable over 30 minutes.

TABLE 31

Examples 91-94 Formulations in Volume % or Grams

| Components | Example 91 | Example 92 | Example 93 | Example 94 |
|---|---|---|---|---|
| Solution 1 | | | | |
| DI Water | 80 | 75 | 70 | 55 |
| Berol ® 260 SA | 1.5 | 1.5 | 1.5 | 1.5 |
| Soytek ™ 1000 ES | 4.5 | 4.5 | 4.5 | 4.5 |
| Solution 2 | | | | |
| 7536-M-70[1] | 5 | 10 | 15 | 30 |
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]OPC Polymers, 1920 Leonard Avenue, Columbus, OH 43219

Examples 95-98

In these examples the bonding additive preparation was performed as Example 9 with STIPolymer Sycoat 273 acrylic emulsion and the final emulsions were stable over 30 minutes.

TABLE 32

Examples 95-98 Formulations in Volume % or Grams

| Components | Example 95 | Example 96 | Example 97 | Example 98 |
|---|---|---|---|---|
| Solution 1 | | | | |
| DI Water | 80 | 75 | 70 | 55 |
| Berol ® 260 SA | 1.5 | 1.5 | 1.5 | 1.5 |
| Soytek ™ 1000 ES | 4.5 | 4.5 | 4.5 | 4.5 |

TABLE 32-continued

Examples 95-98 Formulations in Volume % or Grams

| Components | Example 95 | Example 96 | Example 97 | Example 98 |
|---|---|---|---|---|
| Solution 2 | | | | |
| Sycoat 273[1] | 5 | 10 | 15 | 30 |
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]STI Polymers, 5618 Clyde Rhyne Drive, Sanford, NC 27330

Examples 99-102

In these examples the bonding additive preparation was performed as Example 9 with STI Sycoat X-212-263E-1 additive and the emulsions were stable over 30 minutes.

TABLE 33

Examples 99-102 Formulations in Volume % or Grams

| Product (vol. %) | Example 99 | Example 100 | Example 101 | Example 102 |
|---|---|---|---|---|
| Solution 1 | | | | |
| DI Water | 80 | 75 | 70 | 55 |
| Berol ® 260 SA | 1.5 | 1.5 | 1.5 | 1.5 |
| Soytek ™ 1000 ES | 4.5 | 4.5 | 4.5 | 4.5 |
| Solution 2 | | | | |
| X-212-263E-1[1] | 5 | 10 | 15 | 30 |
| VertecBio ™ Citrus I20 | 1.0 | 1.0 | 1.0 | 1.0 |
| Methocel 311 | 0.1 g | 0.1 g | 0.1 g | 0.1 g |
| PCBTF | 8 | 8 | 8 | 8 |

[1]STI Polymer, 5618 Clyde Rhyne Drive, Sanford, NC 27330

A plywood section was primed with Kiltz 2 Gray tinted latex primer. Sherwin Williams A-100 Exterior Satin Latex Paint was then diluted with 15% of the products. A 3 inch by 4 inch section was then coated with the paint mixture with a 1 inch synthetic paint brush and a full brush load used to test brush stroke length. A quick screening of adhesion was conducted using Gorilla Tape Camo Duct Tape (UPC052427601094) which was applied to the paint (after curing two days) and then the strips pulled up every hour for a total of four hours. Leveling and Coverage were subjectively rated on a scale with 1=Poor performance and 5=Excellent performance. If the product did not fail in the tape test, then it is designated by DNF. The samples were aged two days, in some cases this may not have been time to fully cure the samples.

TABLE 34

Rapid Screening of Paint Adhesion and Performance with Bonding Additives in SW A-100 Paint

| Product (15 vol. %) | DT[1] (min) | BSL[2] (cm) | Leveling[3] | Coverage[3] | TAFT[4] (min) |
|---|---|---|---|---|---|
| Paint (Control)[5] | 13 | 21 | 3 | 3.5 | 4 |
| DI Water | 15 | 30 | 3.5 | 4 | 4 |
| Example 60 | 12 | 14.5 | 4 | 4 | 3 |
| Example 61 | 15 | 14.5 | 3 | 3 | 1.5 |
| Example 64 | 18 | 11 | 1 | 2 | 3 |
| Example 65 | 29 | 15 | 4 | 4 | DNF |
| Example 68 | 14 | 13.5 | 3 | 3.5 | DNF |
| Example 69 | 21 | 13.5 | 4 | 4 | 4 |

TABLE 34-continued

Rapid Screening of Paint Adhesion and Performance with Bonding Additives in SW A-100 Paint

| Product (15 vol. %) | DT[1] (min) | BSL[2] (cm) | Leveling[3] | Coverage[3] | TAFT[4] (min) |
|---|---|---|---|---|---|
| Example 70 | 28 | 18 | 2 | 3 | 3 |
| Example 72 | 15 | 22 | 3 | 3 | 3 |
| Example 77 | 8 | 9 | 3.5 | 4 | DNF |
| Example 78 | 15 | 15 | 3.5 | 3.5 | 4 |
| Example 77 | 18 | 12.5 | 3.5 | 3.5 | 1.5 |
| Example 79 | 12 | 19.5 | 4 | 4 | 3 |
| Example 80 | 22 | 10.5 | 2 | 3 | 4 |
| Example 83 | 14 | 13.5 | 2.5 | 3 | 4 |
| Example 84 | 26 | 18.5 | 3 | 3 | DNF |
| Example 85 | 8 | 15 | 3.5 | 3.5 | 4 |
| Example 86 | 17 | 20.5 | 3.5 | 4 | DNF |
| Example 87 | 18 | 30 | 2 | 2 | DNF |
| Example 88 | 17 | 25 | 4 | 4 | DNF |
| Example 89 | 18 | 14.5 | 3 | 3.5 | DNF |
| Example 90 | 17 | 17 | 2.5 | 4 | DNF |
| Example 91 | 23 | 12 | 4 | 4 | DNF |
| Example 92 | 31 | 23.5 | 3.5 | 3.5 | DNF |
| Example 96 | 15 | 18.5 | 3.5 | 4 | DNF |
| Example 97 | 14 | 21.5 | 4 | 4 | DNF |
| Example 100 | 12 | 14 | 3 | 3 | DNF |
| Flood Emulsabond ®[6] | 17 | 15.5 | 2 | 3 | 4 |

[1]Dry Time
[2]Brush Stroke Length
[3]Scale 1 = poor to 5 = excellent
[4]Tape Adhesion Failure Time
[5]Averaged over two tests
[6]Used according to the bottle directions Adhesion Test with Sherwin Williams A-100 Exterior Latex Satin White Base Paint A Positest AT-M adhesion testing unit was used with 20 mm aluminum dollies according to the AS™ 4541 method. We found that a complete cure of the Loctite 907 Adhesive (Henkel/Loctite, 1001 Trout Brook Crossing, Rocky Hill, Conn. 06067-3910) was best achieved overnight or longer in a 120° F. lab oven or over 3 days at room temperature. The paint was diluted with 15% of each product (or by the directions for the Flood Emulsabond®). The paint was applied to an old door coated with yellowed, glossy oil based paint. The goal was to provide a practical adhesion test. Each test was conducted twice and the values obtained averaged.

TABLE 35

Adhesion Testing of Bonding Additives Using the Positest AT-M

| Product | Average Adhesion (psi) | Comments |
|---|---|---|
| Paint (Control) | 92 | Film Peels Easily |
| Flood Emulsabond ® | 58 | Barely sticks |
| Example 100 | 130 | Tougher to peel |
| Example 69 | 186* | Extremely tough to peel |
| Example 84 | 185 | Hard to peel |
| Example 92 | 176 | Very Difficult to peel |
| Example 96 | 166 | Hard to peel |

*Single data point the second test did not fail (pulled up the substrate), so this is a minimum adhesion value An old Lazy Susan oak piece coated with a clear varnish was wiped down (pretreated) with a lint free rag dampened with each additive formula and then allowed to dry overnight. A control section was painted with Kiltz 2 Latex Primer for comparison. Adhesion was measured in PSI by the Positest A™ as described above. The Sherwin Williams A-100 Exterior Latex Satin Paint was diluted with 12% v/v with each additive product. The Dolly was aged at lab conditions for several days.

TABLE 36

Positest AT-M Adhesion Testing of Bonding Additives on Aged Furniture

| Product (12 vol. %) | PSI Adhesion Failure[1] | PSI Failure Adhesion[2] |
|---|---|---|
| A100 Paint | 790 | N/A |
| DI Water | 758 | N/A |
| Flood Emulsabond ® | 676 | N/A |
| Example 69 | 761 | 983 |
| Example 70 | 721 | 1108 |
| Example 101 | 783 | 1142 |
| Example 102 | 677 | 772 |

[1]Coated with Kiltz 2 Primer
[2]Pretreated with Additive Blend

Hardness Improving Agent Formulations

A fast screening process was employed to formulate and test a wide variety of products to evaluate their ability to improve the hardness of contractor grades of paint as an additive. The preparations were conducted as Example 9. The blends all contained 4.5% Soyanol 1000 EX, 1% Vertec Citrus 120, 8% PCBTF and 0.15 g Dow Methocel 311. All of the products also contained 1.6% Berol® SA 260 surfactant (added first to the water), except for the two Dupont™ Capstone™ products, which used 1.6% of Dupont™ Capstone™ FS31 surfactant. The organic mixture was then slowly added with good mixing into the aqueous mixture. The balance of each formula was met with DI Water to equal 100% total volume.

TABLE 37

Hardness Improving Paint Additives Preparation

| Example | Product | % Product (vol. %) |
|---|---|---|
| 103 | Rhodoline ® 4160 | 5 |
| 104 | Rhodoline ® 4400 | 5 |
| 105 | Capstone ™ FS-81 | 3.5 |
| 106 | Encor ™ 7247 | 15 |
| 107 | OPC Polymers 6502-100 | 10 |
| 108 | OPC 7662-100 | 10 |
| 109 | Soytek ™ SG 40 | 10 |
| 110 | Dupont ™ Capstone ™ FS-63 | 3.5 |
| 111 | Buhler Oxylink ™ 3103 | 15 |
| 112 | BYK Aquamat 208 | 15 |
| 113 | Saiden X-212-263-E1 | 15 |
| 114 | Shin-Etsu KBE-22 | 10 |
| 115 | Potters Spheriglass ™ 4000 | 10 |
| 116 | BASF Ekfa 3777 | 15 |
| 117 | 3M ™ PM-5000 | 10 |
| 118 | 3M ™ SRC-220 | 10 |
| 119 | 3M ™ FC-5120A | 10 |
| 120 | Troy Troysol ™ Z370 | 10 |
| 121 | Elementis Dapro ® FX 514 | 10 |
| 122 | Jonacryl ® 1532 | 10 |
| 123 | Potters Sphericel ™ 110P8CP02 | 10 |
| 124 | Saiden Sycoat 273 | 15 |
| 125 | 3M ™ Ceramic Microspheres 610 | 10 |
| 126 | 3M ™ Ceramic Microspheres 410 | 10 |
| 127 | 3M ™ Ceramic Microspheres 210 | 10 |
| 128 | Saiden Sycoat 263 | 15 |
| 129 | BYK NanoBYK 3620 | 15 |
| 130 | Hauthane HD-2125[1] | 15 |
| 131 | Hauthane HD-2117[1] | 15 |
| 132 | Clariant Ceridust ® 3715 | 15 |
| 133 | Clariant Licowax ® PE 520 | 15 |
| 134 | BYK Aquacer 552 | 15 |
| 135 | BYK Aquacer 553 | 15 |
| 136 | MPI Aquaklean 402[3] | 15 |
| 137 | MPI Micropro 400[3] Micropowder | 15 |
| 138 | Arkema Latex 2533 | 30 |
| 139 | Arkema Encor 282 | 30 |
| 140 | Arkema Snap 728 | 30 |
| 141 | Arkema Encor 631 | 30 |
| 142 | Arkema Encor 7247 | 30 |

[1]C. L. Hauthaway & Sons Corporation, 638 Summer Street Lynn, MA 01905-2092
[2]Clariant Intl. Ltd., Business Unit Additives, Marketing and Operation Waxes, Rothausstrasse 61, 4132 Muttenz, Switzerland.
[3]Micropowders, Inc., 580 White Plains Road, Tarrytown, NY 10591

A drywall section was primed with Sherwin Williams Multi-purpose Primer. The product was then added to Sherwin Williams ProMar 200 Zero VOC Interior Latex Semi-Gloss paint at 12% (v/v). A 3"×4" section was then coated with a 1" synthetic brush to qualitatively evaluate coverage and leveling and a loaded brush used to generate a relative brush stroke length before significant breaks were observed in the continuity of the paint. Leveling and coverage were evaluated as 1=Poor Performance and 5=Excellent performance.

TABLE 38

Paint Testing of Hardness Improving Additive in SW PM 200 Paint

| Example | Product (12 vol. %, v/v) | Leveling[a] | Coverage[a] | BSL[b] (cm) | DT[c] (min) |
|---|---|---|---|---|---|
| Control* | N/A | 3 | 3 | 18.5 | 16 |
| DI Water | N/A | 2 | 2 | 30.5 | 17 |
| 103 | Rhodoline ® 4160 | 3 | 3 | 44 | 12 |
| 104 | Rhodoline ® 4400 | 3.5 | 3.5 | 33.5 | 14 |
| 105 | Capstone ™ FS-81 | 3 | 3 | 23.5 | 15 |
| 106 | Encor 7247 | 3.5 | 3.5 | 26.5 | 9 |
| 107 | OPC Polymers 6502-100 | 3 | 3 | 29.5 | 7 |
| 108 | OPC 7662-100 | 3 | 3 | 20 | 10 |
| 109 | Soytek ™ SG 40 | 3 | 3 | 24.5 | 10 |
| 110 | Dupont ™ Capstone ™ FS-63 | 2.5 | 2.5 | 33 | 13 |
| 111 | Buhler Oxylink 3103 | 3 | 3 | 18 | 12 |
| 112 | BYK Aquamat 208 | 3 | 3 | 24 | 9 |
| 113 | Saiden X-212-263-E1 | 2.5 | 2.5 | 19 | 10 |
| 114 | Shin-Etsu KBE-22 | 2.5 | 2.5 | 26 | 18 |
| 115 | Potters Spheriglass 4000 | 3 | 3 | 17 | 15 |
| 116 | BASF Ekfa 3777 | 2.5 | 2.5 | 17.5 | 8 |
| 117 | 3M PM-5000 | 3.5 | 3.5 | 22 | 11 |
| 118 | 3M SRC-220 | 3 | 3 | 26 | 15 |
| 119 | 3M FC-5120A | 2.5 | 2.5 | 21.5 | 10 |
| 120 | Troy Troysol ™ Z370 | 3 | 3 | 18 | 13 |

TABLE 38-continued

Paint Testing of Hardness Improving Additive in SW PM 200 Paint

| Example | Product (12 vol. %, v/v) | Leveling[a] | Coverage[a] | BSL[b] (cm) | DT[c] (min) |
|---|---|---|---|---|---|
| 121 | Elementis Dapro FX 514 | 2.5 | 2.5 | 23.5 | 13 |
| 122 | Jonacryl 1532 | 3 | 3 | 21.5 | 14 |
| 123 | Potters Sphericel 110P8CP02 | 2.5 | 2.5 | 19 | 12 |
| 124 | Saiden Sycoat 273 | 2.0 | 2.0 | 15 | 13 |
| 125 | 3M Ceramic Microspheres 610 | 2.5 | 2.5 | 17.5 | 9 |
| 126 | 3M Ceramic Microspheres 410 | 2.5 | 2.5 | 27.5 | 11 |
| 127 | 3M Ceramic Microspheres 210 | 2.5 | 2.5 | 25.5 | 19 |
| 128 | Saiden Sycoat 263 | 2.5 | 2 | 17 | 10 |
| 129 | BYK NanoBYK 3620 | 2.5 | 2.5 | 27.5 | 11 |
| 130 | Hauthane HD-2125[1] | 3 | 3 | 23 | 6 |
| 131 | Hauthane HD-2117[1] | 2.5 | 2.5 | 29 | 12 |
| 132 | Clariant Ceridust 3715 | 3 | 3 | 21.5 | 11 |
| 133 | Clariant Licowax PE 520 | 2.5 | 2.5 | 18.5 | 7 |
| 134 | BYK Aquacer 552 | 3 | 3 | 26 | 20 |
| 135 | BYK Aquacer 553 | 3 | 3 | 24 | 9 |
| 136 | MPI Aquaklean 402[3] | 2.5 | 2.5 | 28 | 10 |
| 137 | MPI Micropro 400[3] Micropowder | 3 | 3 | 23 | 8 |
| 138 | Arkema Latex 2533 | 2.5 | 2 | 28 | 21 |
| 139 | Arkema Encor 282 | 3 | 3 | 23.5 | 14 |
| 140 | Arkema Snap 728 | 2 | 2 | 25.5 | 12 |
| 141 | Arkema Encor 631 | 3 | 3 | 28.5 | 18 |
| 142 | Arkema Encor 7247 | 2.5 | 2 | 14 | 14 |

[a]Scale 1 = poor to 5 = excellent
[b]Blush Stroke Length
[c]Dry Time
[1]C. L. Hauthaway & Sons Corporation, 638 Summer Street Lynn, MA 01905-2092
[2]Clariant Intl. Ltd., Business Unit Additives, Marketing and Operation Waxes, Rothausstrasse 61, 4132 Muttenz, Switzerland.
[3]Micropowders, Inc., 580 White Plains Road, Tarrytown, NY 10591
*SW PM 200 Paint Taber Metal Squares from Q Labs were coated with one* or two coats of each product in the SW ProMar® 200 samples above and then subjected to 1500 cycles with a Taber Abraser equipped with 500 g weights and Taber CS-10 Calibrase wheels. The loss of weight was then measured after each test. The adhesion was tested using a Positest AT-M adhesion tester as above. The samples were cured for a several days for the adhesion test (more time may have been necessary for a complete cure).

TABLE 39

Taber Abrasion Testing of Hardness Improving Paint Additives in SW PM 200 Paint

| Example | Product (12 vol. %) | Grams Paint Lost in 1500 cycles (CS-10 with 500 g) | Adhesion (PSI) |
|---|---|---|---|
| DI Water | N/A | 0.1649 | |
| N/A | N/A | 0.1955 (Average) | 357 (avg.) |
| 103 | Rhodoline 4160 | 0.0309 | 157 |
| 104 | Rhodoline 4400 | 0.1386 | 262 |
| 105 | Capstone FS-81 | 0.0248 | 209 |
| 106 | Encor 7247 | 0.0232 | Did not fail |
| 107 | OPC Polymers 6502-100 | 0.0246 | 218 |
| 108 | OPC 7662-100 | 0.1235 | 237 |
| 109 | Soytek ™ SG 40 | 0.0036 | ND |
| 110 | Dupont Capstone FS-63 | 0.1079 | 165 |
| 111 | Buhler Oxylink 3103 | 0.0915 | 260 |
| 112 | BYK Aquamat 208 | 0.0365 | 235 |
| 113 | Saiden X-212-263-E1 | 0.0997 | 275 |
| 115 | Potters Spheriglass 4000 | 0.2886* | 482 |
| 117 | 3M PM-5000 | 0.2343* | 283 |
| 118 | 3M SRC-220 | 0.0325 | ND |
| 119 | 3M FC-5120A | ND | 267 |
| 122 | Jonacryl 1532 | 0.0931 | 155 |
| 123 | Potters Sphericel 110P8CP02 | 0.1068 | 100 |
| 125 | 3M Ceramic Microspheres 610 | 0.0020 | 216 |
| 126 | 3M Ceramic Microspheres 410 | 0.0893 | 209 |
| 127 | 3M Ceramic Microspheres 210 | ND | 200 |
| 128 | Saiden Sycoat 263 | 0.0469 | 254 |
| 129 | BYK NanoBYK 3620 | ND | ND |
| 130 | Hauthane HD-2125[1] | ND | 162 |
| 131 | Hauthane HD-2117[1] | 0.2602* | 383 |
| 134 | BYK Aquacer 552 | 0.1116 | 206 |
| 135 | BYK Aquacer 553 | 0.1119 | 199 |
| 136 | MPI Aquaklean 402[3] | 0.0302* | 290 |
| 137 | MPI Micropro 400[3] Micropowder | ND | 213 |
| 138 | Arkema Latex 2533 | 0.0349* | 257 |
| 139 | Arkema Snap 728 | 0.0131* | 399 |
| 141 | Arkema Encor 631 | 0.2995* | 471 |
| 142 | Arkema Encor 7247 | 0.0300* | 279 |

*These samples only received 500 cycles of abrasion and one coat of paint.
[1]C. L. Hauthaway & Sons Corporation, 638 Summer Street Lynn, MA 01905-2092
[2]Clariant Intl. Ltd., Business Unit Additives, Marketing and Operation Waxes, Rothausstrasse 61, 4132 Muttenz, Switzerland.
[3]Micropowders, Inc., 580 White Plains Road, Tarrytown, NY 10591

Several combinations of promising additives were attempted to improve the overall product properties of the hardness improving additive. The products were prepared as Example 103, unless otherwise noted.

TABLE 40

Compositions with Improved Overall Product Properties

| Example | Product A | % Product A (vol. %) | Product B | % Product B (vol. %) |
|---|---|---|---|---|
| 143 | 3M Ceramic Microspheres 610 | 5 | Arkema Encor 7247 | 25 |
| 144 | 3M Ceramic Microspheres 610 | 10 | Arkema Encor 7247 | 20 |
| 145 | 3M Ceramic Microspheres 610 | 15 | Arkema Encor 7247 | 20 |
| 146 | 3M Ceramic Microspheres 610 | 20 | Arkema Encor 7247 | 10 |
| 147** | MPI Micropro 400 | 5 | Arkema Encor 7247 | 25 |
| 148** | MPI Micropro 400 | 10 | Arkema Encor 7247 | 20 |
| 149 | MPI Micropro 400 | 15 | Arkema Encor 7247 | 15 |
| 150 | MPI Micropro 400 | 20 | Arkema Encor 7247 | 10 |
| 70 | | | Arkema Encor 7247 | 30 |
| 151* | 3M Ceramic Microspheres 610 | 15 | Arkema Encor 7247 | 15 |
| 152*** | 3M Ceramic Microspheres 610 | 15 | Arkema Encor 7247 | 15 |

*Included 1% BASF Tinuvin 5151 and 7% BYK Optigel CK Masterbatch (prepared by adding 3 grams of Optigel CK to 55 grams of DI Water) with the offsetting amount of DI Water removed from the formula.
**The blend did not disperse properly and chunks of solid formed.
***Included 3% Tinuvin 5151, 9% BYK Optigel Masterbatch, 1.5% Cortec M380 (Cortec Corp. 4119 White Bear Parkway, St. Paul, MN 55110 USA) and 0.6% BASF Foamstar 2410

All samples were abraded for 700 cycles with the weights measured before and after abrasion as in Example 103 above.

TABLE 41

Taber Abrasion Testing

| Example | Amount of weight lost (g) |
|---|---|
| Paint Control | 0.1094 |
| DI Water | 0.0961 |
| 143 | 0.0853 |
| 144 | 0.0718 |
| 145 | 0.0844 |
| 146 | 0.0789 |
| 147 | N/A (blend failed) |
| 148 | N/A (blend failed) |
| 149 | 0.0798 |
| 150 | 0.1057 |
| 70 | 0.0913 |

Metal surfaces were cleaned with Crown™ Pro Clean Up™ and then pretreated with a lint free rag dampened with the additive. The metal was then allowed to dry for 1-2 hours and then two coats of paint applied with a 1" synthetic brush. The product was added to Sherwin Williams Pro Mar 200 Zero VOC Latex Semi Gloss Paint.

TABLE 42

Testing of Bonding Paint Additives on Metals

| Example | Mild Steel Bond Failure (PSI) | Aluminum Sheet Bond Failure (PSI) |
|---|---|---|
| Paint (Control) | 647 | 366 |
| DI Water | 767 | 619 |
| 70 | 1405 | 1010 |
| 152 | 740 | 943 |

The following Examples were formulated with Soyanol 1000 EX at 3% (v/v), Vertec Citrus 120 at 1%, Berol® 260 at 1.5%, Foamstar 2410 at 0.6%, Dow Corning 2210 at 0.6%, PCBTF at 8% and 0.7 grams of Methocel 311 powder. The Berol® 260 SA and DI Water (balance of formula) were mixed. The remaining ingredients were mixed and then added to the aqueous mixture. The additives were then mixed in on top of the resulting emulsion and mixed for about 30 minutes using a magnetic stirrer. The experiment was conducted as a low/high screening experiment with one low level addition of the additive and a higher level loading of the additive for comparison.

The products were then added to Sherwin Williams A-100 Satin Exterior Latex Paint with Jetstream Blue Tinting at 12% (v/v) and tested as Example 103. The exception was that each test section was also sprayed with DI Water to qualitatively evaluate relative water repellency. The qualitative terms are in rated "1" for poor performance and "5" for excellent performance.

TABLE 43

Dirt Repellant Paint Additive Preparations and Paint Testing in A-100 Exterior Paint

| Product (12 vol. %, v/v) | Example | Low Loading (% v/v) | High Loading (% v/v) | Coverage[1] | Leveling[1] | BSL[2] (cm) | WR[3] |
|---|---|---|---|---|---|---|---|
| A-100 Paint (Control) | N/A | N/A | N/A | 1.5 | 1.5 | 1 | 1 |
| DI Water | N/A | N/A | N/A | 2 | 2 | 18 | 1 |
| BYK Aquamat 208 | 153 | 1 | 5 | 3/3 | 3/3 | 24.5/25.5 | 3/3 |
| BASF Efka 3777 | 154 | 5 | 20 | 2.5/2 | 2.5/2 | 24/17.5 | 1/1 |
| BYK 333 | 155 | 5 | 10 | 2/2 | 2/2 | 22.5/16 | 1/1 |
| Siltech C-20 | 156 | 1 | 10 | 1/1 | 1/1 | 25.5/14.5 | 2/2 |
| Siltech C-816 | 157 | 1 | 15 | 1.5/1.0 | 1.5/1.0 | 22.5/21.5 | 4/3[a] |
| Siltech C-176 | 158 | 1 | 5 | 2.5/2.5 | 2.5/2.5 | 21/19.5 | 1/1 |
| Dow Additive 87 | 159 | 10 | 50 | 1.5/1.5 | 1.5/1.5 | 22.5/17.5 | 3/4 |
| 3M Stain Resist PM-5000 | 160 | 5 | 30 | 2.5/2.5 | 2.5/2.5 | 18/17 | 2/4[b] |
| 3M SRC-220 | 161 | 5 | 10 | 2/2 | 2/2 | 18/20.5 | 2/2 |
| 3M FC-5120 | 162 | 5 | 10 | 2/2 | 2/2 | 20.5/16.5 | 2/2 |
| Oleon Radiasurf 7443[5] | 163 | 1 | 5 | 2.5/2.5 | 2.5/2.5 | 21/24.5 | 2/2 |

TABLE 43-continued

Dirt Repellant Paint Additive Preparations and Paint Testing in A-100 Exterior Paint

| Product (12 vol. %, v/v) | Example | Low Loading (% v/v) | High Loading (% v/v) | Coverage[1] | Leveling[1] | BSL[2] (cm) | WR[3] |
|---|---|---|---|---|---|---|---|
| Rhodia Rhoplex WL-71 | 164 | 5 | 15 | 2.5/2.5 | 2.5/2.5 | 19/20 | 2/2 |
| STI Sycoat 84 | 165 | 10 | 40 | 2/1.5 | 2/1.5 | 23/17.1 | 2/2 |
| Arkema Kynar Aquatec ® FMA-12 | 166 | 15 | 30 | 1.5/1 | 1.5/1 | 36/30 | 2/3 |
| Berol ® 609A | 167 | 1 | 10 | 1.5/1.5 | 1.5/1.5 | 18.5/22.5 | 2/2 |
| Arkema Kynar Aquatec ARC | 168 | 20 | 40 | 3/2 | 3/2 | 22/22 | 3/3 |
| BYK Aquacer 539 | 169 | 10 | 30 | 1/2 | 1/2 | 22.5/23 | 4/5 |
| Lubrizol Carboset 850 | 170 | 15 | 40 | 1.5/1.5 | 1.5/1.5 | 22/24 | 2/2 |
| Troysol ™ Z370 | 171 | 1 | 5 | 2/2 | 2/2 | 28/27.5 | 2/4 |
| Thetapel © AM-5010[6] | 172 | 15 | 30 | 1.5/3 | 1.5/3 | 35/19.5 | 2/4 |
| Thetaguard HS 3000[6] | 173 | 10 | 30 | 1/1 | 1/1 | 20/20 | 2/2 |
| Rhodia Rhoplex WL-100 | 175 | 5 | 15 | 1/1 | 1/1 | 21/22 | 2/2[b] |
| Lubrizol Carboset 795 | 176 | 15 | 40 | 1/3 | 1/3 | 20/26 | 4/4 |
| Lubrizol Aquaslip 680 | 177 | 15 | 30 | 3/3 | 3/3 | 19/22.5 | 1/1 |
| BYK Aquamat 272 | 178 | 10 | 30 | 2.5/2 | 2.5/2 | 24/22.5 | 2/2 |
| MPI Aquaklean Powder | 179 | 15 | 40 | 1.5/3 | 1.5/3 | 18.5/20 | 4/5 |
| Dupont Capstone ® FS-81 | 180 | 1 | 5 | 1.5/1.5 | 1.5/1.5 | 20.5/20.5 | 1/1 |
| Rhodia Rhoplex WL-81 | 181 | 5 | 15 | 1.5/1.5 | 1.5/1.5 | 24/26.5 | 1/1[b] |
| Rhodia Rhoplex WL-51 | 182 | 5 | 15 | 2.5/2 | 2.5/2 | 21/18 | 2/2 |
| STI Sycoat 29 | 183 | 10 | 40 | 2/2 | 2/2 | 18.5/18 | 1/1[b] |
| BYK Aquacer 552[7] | 184 | 10 | 30 | 2/1.5 | 2/1.5 | 21/18 | 1/1[b] |
| Troy Troysol ™ M52[7] | 185 | 1 | 4 | 1/1 | 1/1 | 23.5/25 | 1/2[b] |
| Siltech C-20[7] | 186 | 1 | 10 | 2.5/1.5 | 2.5/1.5 | 17/18.5 | 1/1[c] |
| Buhler Oxylink 3013[7] | 187 | 1 | 5 | 2.5/2.5 | 2.5/2.5 | 18/24.5 | 2/1 |
| Arkema Flex 3186 | 188 | 15 | 50 | 1.5/2 | 1.5/2 | 21/23.5 | 1/2 |
| Reichhold Epotuf 38-694 | 189 | 15 | 50 | 2.5/2.5 | 2.5/2.5 | 26/18 | 3/3 |
| Lubrizol Aquaslip 942 | 190 | 15 | 50 | 3/2.5 | 3/2.5 | 22/24 | 1/1 |

[1]Scale 1 = Poor to 5 = Excellent
[2]Brush Stroke Length - low/high
[3]Water Repellency - low/high
[5]Oleon M&S - Base Oleochemicals, Assenedestraat 2, 9940 Ertvelde, Belgium
[6]Innovative Chemical Technologies, Inc., 103 Walnut Grove Rd, Cartersville, GA 30120
[7]These formulas contain no PCBTF with the balance of the formula made up with DI Water
[a]emulsion failed
[b]Pinholes
[c]Big Pinholes The following Examples were formulated with Soyanol 1000 EX at 3% (v/v), Vertec Citrus 120 at 1%, Berol® 260 at 1.5%, Foamstar 2410 at 0.6%, Dow Corning 2210 at 0.6% and 0.7 grams of Methocel 311 powder. The Berol® 260 SA and DI Water (balance of formula) were mixed. The remaining ingredients were mixed and then added to the aqueous mixture. The additives products were then poured on top of the resulting emulsion and mixed for about 30 minutes using a magnetic stirrer. The experiment was conducted to screen for compatible additives with two different additives in each formulation.

The products were then added to Sherwin Williams A-100 Satin Exterior Latex Paint with Jetstream Blue Tinting at 12% (v/v) and tested as Example 103. The exception was that each test section was also sprayed with DI Water to qualitatively evaluate relative water repellency.

TABLE 44

Screening of Dirt Repellant Paint Additives for Use in SW A-100 Paint

| Product (12 vol. %, v/v) | Example | 1st Additive (vol. %) | 2nd Additive (vol. %) | Coverage[1] | Leveling[1] | BSL[2] (cm) | WR[3] |
|---|---|---|---|---|---|---|---|
| Paint (Control) | | N/A | N/A | 3.3* | 3.3 | 22 | 1 |
| DI Water | | N/A | N/A | 2.8* | 2.8* | 21.5 | 1 |
| MPI 402 and Troysol ™ Z370 | 191 | 30 | 2 | 2 | 2 | 23 | 4[3] |
| MPI 402 and Lubrizol 795 | 192 | 30 | 5 | 2.5 | 2.5 | 24 | 5 |
| MPI 402 and Lubrizol 795 | 193 | 30 | 10 | 2 | 2 | 18 | 4 |
| MPI 402 and Troysol ™ Z370 | 194 | 30 | 1 | 3 | 3 | 20 | 5 |
| MPI 402 | 195 | 30 | N/A | 3 | 3 | 20 | 5 |
| MPI 402 | 196 | 35 | N/A | 3 | 3 | 21.5 | 5 |

[1]Scale 1 = Poor to 5 = Excellent
[2]Brush Stroke Length
[3]Water Repellency

Testing of Dirt Repellency

A number of Q-Panels™ were primed with Sherwin Williams Procryl Universal Latex Primer. The panels were allowed to dry and were then cured overnight at room temperature. The panels where then coated with Sherwin Williams A-100 Satin Exterior Latex Paint by dipping the panels in the paint diluted 12% (v/v) with the additive product. The panels were cured in a 120° F. over overnight. A mixture of water with 2.5% Miracle Grow Organic Potting Soil and 7.5% Generic Soil, 1% Glycol Ether EB and the balance water was used to treat each panel with 6 mL of the dirt and water mixture. The samples were dried overnight in a 120° F. oven overnight for the sample listed as "aged" in Table 45. The panels were blindly evaluated by forced ranking for ease of cleaning and residual dirt observed (1 is the top ranking)

TABLE 45

Dirt Repellant Additive Testing in SW A-100 Satin Paint

| Product (12 vol. %, v/v) | Example | Gloss (GU @ 60°) | FR[1] (1st App) | FR[1] (2nd App) | FR[1] (3rd App) | FR[1] (4th App) |
|---|---|---|---|---|---|---|
| A-100 Paint (control) | N/A | 19.9 | 7 | 7 | 7 | 3.5 |
| DI Water | N/A | 17.2 | 8 | 8 | 4 | 6 |
| Troysol ™ Z370 (High) | 171 | 17.9 | 3 | 3 | 3 | 5 |
| Dow Additive 87 (High) | 159 | 18.3 | 5 | 5 | 6 | 4 |
| 3M PM-5000 (High) | 160 | 17.9 | 4 | 4 | 5 | 7 |
| BYK Aquacer 539 (High) | 174 | 17.0 | 2 | 2 | 2 | 3 |
| Lubrizol Carboset 795 | 176 | 17.3 | 6 | 6 | 6 | 2 |
| MPI AquaKlean 402 | 179 | 20.2 | 1 | 1 | 1 | 1 |

[1]Forced Ranking

Another dirt repellency test was conducted using the same method as above. The second and fourth applications were aged overnight as before and the first and third application just aged an hour. In this case, the panels were rated qualitatively for ease of cleaning with 1=Poor Performance to 5=Excellent Performance.

TABLE 46

Aging Test of Dirt Repellant Paint Additive in SW A-100 Satin Paint

| Example | 1st Application[1] | 2nd Application[2] | 3rd Application[1] | 4th Application[2] |
|---|---|---|---|---|
| A-100 Paint Control | 1 | 1 | 1 | 1 |
| DI Water | 2 | 2 | 2 | 2 |
| 194 | 4 | 4.25 | 5 | 5 |
| 191 | 4 | 4.75 | 4 | 4.75 |
| 193 | 4.5 | 4.5 | 4.5 | 4.75 |
| 194 | 4.5 | 4.5 | 4.5 | 4.75 |
| 192 | 5 | 5 | 5 | 5 |
| 196 | 5 | 5 | 4.25 | 5 |

[1]Scale 1 = Poor to 5 = Excellent initial
[2]Scale 1 = Poor to 5 = Excellent aged A base formulation was prepared with the following (v/v): 79% water, 3% Berol® 260 SA and 5% Glycerin (mixed for 20 minutes). Another container had 2% Texanol, 1% BASF Foamstar 2410, 1% BASF Tinuvin 5151, 8% Soyanol 1000 ES, 1% d-Limonene and 1 g/100 mL of Dow Cellosize™ QP 4400H. The latter mixture was agitated well and then slowly added to the aqueous mixture to afford a stable emulsion. The resulting masterbatch was blended with the additives listed below at a 50 mL level and the balance of the formula made up with DI Water to equal 100 mL total volume.

TABLE 47

Screening Experiment for Bonding Paint Additives with High and Low Loadings

| Example | Additive | Manufacturer | Low Loading (vol. %) | High Loading (vol. %) |
|---|---|---|---|---|
| 197 | Encor 282 | Arkema | 10 | 40 |
| 198 | Aquatec ARC | Arkema | 10 | 40 |
| 199 | Encor 631 | Arkema | 10 | 50 |
| 200 | Snap 728 | Arkema | 10 | 50 |

TABLE 47-continued

Screening Experiment for Bonding Paint Additives with High and Low Loadings

| Example | Additive | Manufacturer | Low Loading (vol. %) | High Loading (vol. %) |
|---|---|---|---|---|
| 201 | Neocar 2535 | Arkema | 10 | 50 |
| 202 | DL 313 | Arkema | 10 | 50 |
| 203 | Encor 367 | Arkema | 10 | 50 |
| 204 | Encor 300 | Arkema | 10 | 50 |
| 205 | Synaqua 4804 | Arkema | 10 | 50 |
| 206 | Encor 627 | Arkema | 10 | 40 |
| 207 | Carboset SA-850 | Lubrizol | 10 | 40 |
| 208 | Carboset CA-600 | Lubrizol | 10 | 50 |
| 209 | Carboset AE-960 | Lubrizol | 10 | 40 |
| 210 | Sancore 825 | Lubrizol | 2.5 | 5 |
| 211 | Solthix A100 | Lubrizol | 5 | 10 |
| 212 | Turboset Ultra ECO | Lubrizol | 10 | 30 |
| 213 | Carboset 795 | Lubrizol | 10 | 50 |
| 214 | Lanco Glidd 3540 | Lubrizol | 10 | 40 |
| 215 | Lanco Pew 1555 | Lubrizol | 10 | 40 |
| 216 | Sancore AU4010 | Lubrizol | 5 | 10 |
| 217 | Carboset 761 | Lubrizol | 10 | 40 |
| 218 | Lanco TFW 1765 | Lubrizol | 5 | 20 |
| 219 | Carboset 765 | Lubrizol | 10 | 30 |
| 220 | Carboset 728 | Lubrizol | 2.5 | 5 |
| 221 | Aquaslip 680 | Lubrizol | 5 | 35 |
| 222 | Carboset 510 (VOC free) | Lubrizol | 10 | 50 |
| 223 | Lanco 1380 | Lubrizol | 5 | 30 |
| 224 | Carboset CA 1009 | Lubrizol | 10 | 30 |
| 225 | Rovene 4180 | Mallard Creek[1] | 10 | 40 |
| 226 | Rovene6087 | Mallard Creek[1] | 10 | 40 |
| 227 | Rovene 4125 | Mallard Creek[1] | 10 | 40 |
| 228 | Rovene 6119 | Mallard Creek[1] | 10 | 40 |
| 229 | Tychem 8710 | Mallard Creek[1] | 10 | 50 |
| 230 | Rovene 6122 | Mallard Creek[1] | 10 | 50 |
| 231 | HDT-12 | Omnova[2] | 10 | 50 |
| 232 | Pliotec LEB 18 | Omnova[2] | 10 | 50 |
| 233 | Pliotec SA65 | Omnova[2] | 10 | 50 |
| 234 | Pliotec CR30 | Omnova[2] | 10 | 50 |
| 235 | Omnipel 3158 | Omnova[2] | 10 | 50 |
| 236 | Morshine 4U PL-475 | Omnova[2] | 10 | 50 |
| 237 | Pliotec SA60 | Omnova[2] | 10 | 50 |
| 238 | Pliotec EL 25 | Omnova[2] | 10 | 50 |
| 239 | Morshine HGC PL-75 | Omnova[2] | 10 | 50 |
| 240 | Pliotec SA 40 | Omnova[2] | 10 | 50 |
| 241 | Hydro Pliolite WL | Omnova[2] | 10 | 50 |
| 242 | Avicor 2456 | Celanese | 20 | 50 |
| 243 | Sycoat 223 | STI Polymers | 10 | 50 |
| 244 | Sycoat 227 | STI Polymers | 10 | 50 |
| 245 | X-212-368E | STI Polymers | 10 | 50 |
| 246 | Sycoat 263 | STI Polymers | 10 | 50 |
| 247 | Aquapoly 215F | MPI | 5 | 20 |
| 248 | Proplymatte 31 | MPI | 5 | 20 |
| 249 | Nylotex 140 | MPI | 5 | 20 |
| 250 | Aquatex 100 | MPI | 5 | 20 |
| 251 | Aquapoly 215F + 4% ZLAC | MPI and Troy | 5 | 20 |
| 252 | Encor 7247 | Arkema | 10 | 50 |
| 253 | Heweten 101 | J. Rettenmaier[3] | 5 | 20 |
| 254 | 110P8CP01 | Potters | 5 | 20 |
| 255 | XC5 CARB 120 | Imerys[4] | 5 | 20 |
| 256 | XC5 CARB 80 | Imerys[4] | 5 | 20 |

[1]Mallard Creek Polymers, Inc., 14800 Mallard Creek Rd, Charlotte, NC 28262
[2]Omnova, World Headquarters 175 Ghent Road Fairlawn, OH 44333
[3]J. Rettenmaier USA LP, 16369 US Highway 131 Schoolcraft, Michigan 49087
[4]Imerys Pigments & Additives Group, 100 Mansell Court East, Suite 300, Roswell, GA 30076

Furniture grade poplar boards one half inch thick were cleaned with Crown Pro Clean Up™ and then allowed to dry. The boards were then taped off into 2"×2" sections with painter's tape. The sample squares were then pretreated with a lint free rag with each additive formula (by wetting the rag and rubbing the appropriate area) and then allowed to dry overnight. Sherwin Williams A-100 Exterior Satin Latex paint was then diluted 12% (v/v) with each additive above, unless the emulsion was not stable. The designated board sections were painted with two coats of the targeted paint mixture using a 1" synthetic brush. The boards were allowed to dry overnight and then for 5 days in a 120° F. lab oven. A 20 mm aluminum Positest AT-M dolly was attached to each with two part epoxy glue as above and the adhesion value tested as above. It is worth noting that very few, if any of the paints failed. The majority of the samples either pulled up the surface of the wood or led to the adhesive failure. There were examples that pulled up significant fragments of the wood, which did generally coincide with the highest recorded adhesion values.

TABLE 48

Adhesion Testing of Paint Bonding Additives in SW A-100 Satin Exterior Paint

| Example | Additive | Leveling[1,2] | Coverage[1,2] | Gloss[2] (GU) | Adhesion[2] (PSI) |
|---|---|---|---|---|---|
| Average Paint (control) | N/A | 3 | 3 | 7.2 | 746 |
| Average DI Water | N/A | 1.5 | 1.5 | 4.2 | 504 |
| 197 | Encor 282 | 3/3 | 3/3 | 8.7/11.6 | 873/811 |
| 198 | Aquatec ARC | 4/4 | 4/4 | 10.4/10.4 | 761/633 |
| 199 | Encor 631 | 4/4 | 4/4 | 7.8/10.2 | 924[3]/830[3] |
| 200 | Snap 728 | 4/4 | 5/5 | 9.7/9.7 | 773/815 |
| 201 | Neocar 2535 | 4/4 | 4/4 | 8.0/8.9 | 863/857[3] |
| 202 | DL 313 | 4/4 | 4/4 | 8.3/11 | 765/789 |
| 203 | Encor 367 | 4/4 | 4/4 | 7.7/8.0 | 874[3]/939[3] |
| 204 | Encor 300 | 4/4 | 5/5 | 10.1/10.2 | 896[3]/759 |
| 205 | Synaqua 4804 | 3.5/3.5 | 3.5/3.5 | 6.3/7.3 | 995[3]/992[3] |
| 206 | Encor 627 | 3/3 | 3/3 | 7.8/8.2 | 983[3]/820 |
| 207 | Carboset SA-850 | 3/3 | 3/3 | 7.6/7.9 | 835/861 |
| 208 | Carboset CA-600 | 4/4 | 4/4 | 7.2/7.6 | 1061[3]/1151[3] |
| 209 | Carboset AE-960 | 4/4 | 4/4 | 7.2/7.1 | 888/714 |
| 210 | Sancore 825 | 3.5/3.5 | 3.5/3.5 | 6.4/6.2 | 966[3]/939[3] |
| 211 | Solthix A100 | 3/3 | 3/3 | 6.9/7.1 | 784/872 |
| 212 | Turboset Ultra ECO | 2.5/2.5 | 3/3 | 6.9/7.4 | 1053[3]/1143[3] |
| 213 | Carboset 795 | 2.5/3 | 2.5/3 | 7.2/7.7 | 584/695 |
| 214 | Lanco Glidd 3540 | 2.5/3 | 2.5/3 | 6.8/6.9 | 475/368 |
| 215 | Lanco Pew 1555 | 3/3 | 3/3 | 6.4/6.6 | 525/409 |
| 216 | Sancore AU4010 | 3/3 | 3/3 | 6.4/6.0 | 481/539 |
| 217 | Carboset 761 | 3/3 | 3/3 | 5.7/6.1 | 571/684 |
| 218 | Lanco TFW 1765 | 4/4 | 4/4 | 6.3/7.3 | 520/460 |
| 219 | Carboset 765 | 4/4 | 4/4 | 7.5/8.3 | 595/662 |
| 220 | Carboset 728 | 4/4 | 4/4 | 7.8/8.3 | 565/545 |
| 221 | Aquaslip 680 | 3/3 | 3/3 | 7.7/8.1 | 720/615 |
| 222 | Carboset 510 (VOC free) | 2/2 | 2/2 | 6.3/7.3 | 801/988[3] |
| 223 | Lanco 1380 | 3/3 | 3/3 | 6.6/7.4 | 540/381 |
| 224 | Carboset CA 1009 | 3/3 | 3/3 | 7.1/7.8 | 824/843[3] |
| 225 | Rovene 4180 | 3.5/3.5 | 3.5/3.5 | 7.7/8.5 | 753/839 |
| 226 | Rovene 6087 | 3.5/3.5 | 3.5/3.5 | 7.9/10.6 | 726/617 |
| 227 | Rovene 4125 | 4/4 | 4/4 | 9.7/9.6 | 553/730 |
| 228 | Rovene 6119 | 4/4 | 4/4 | 7.1/7.4 | 549/602 |
| 229 | Tychem 8710 | 3/3 | 3/3 | 6.9/7.1 | 465/417 |
| 230 | Rovene 6122 | 3/3 | 3/3 | 7.1/8.1 | 517/819 |
| 231 | HDT-12 | 3/3 | 3/3 | 7.7/10.1 | 651/732 |
| 232 | Pliotec LEB 18 | 3/3 | 3/3 | 6.5/8.1 | 536/574 |
| 233 | Pliotec SA65 | 3/3 | 3/3 | 7.4/8.2 | 427/432 |
| 234 | Pliotec CR30 | 3/3 | 3/3 | 8.1/8.7 | 747/854[3] |
| 235 | Omnipel 3158 | 3/3 | 3/3 | 8.5/8.9 | 504/661 |
| 236 | Morshine 4U pl-475 | 4/4 | 4/4 | 8.1/8.5 | 703/777 |
| 237 | Pliotec SA60 | N/A[4] | N/A[4] | N/A[4] | N/A[4] |
| 238 | Pliotec EL 25 | 3/3 | 3/3 | 7.1/7.5 | 712/744 |
| 239 | Morshine HGC PL-75 | 3/3 | 3/3 | 6.9/6.8 | 502/888[5] |
| 240 | Pliotec SA 40 | 3.5/3.5 | 3.5/3.5 | 6.9/7.6 | 637/937[3] |
| 241 | Hydro Pliolite WL | 3/3 | 3/3 | 5.4/7.7 | 725/785 |
| 242 | Avicor 2456 | 3.5/3.5 | 3.5/3.5 | 7.4/9.6 | 716/808 |
| 243 | Sycoat 223 | 3/3 | 3/3 | 6.3/9.1 | 918[3]/1166[3] |
| 244 | Sycoat 227 | 3/3 | 3/3 | 6.8/7.2 | 979[3]/1136[3] |
| 245 | X-212-368E | 4/4 | 4/4 | 7.1/9.4 | 724/503 |
| 246 | Sycoat 263 | 4/4 | 4/4 | 6.8/7.7 | 742/468 |
| 247 | Aquapoly 215F | N/A[4] | N/A[4] | N/A[4] | N/A[4] |
| 248 | Proplymatte 31 | 3/3 | 3/3 | 6.6/6.7 | 546/510 |
| 249 | Nylotex 140 | 2.5/3.5 | 3.5/3.5 | 6.5/5.8 | 542/629 |
| 250 | Aquatex 100 | 3.5/3.5 | 3.5/3.5 | 5.9/5.6 | 609/589 |
| 251 | Aquapoly 215F + 4% Troysol ™ ZLAC | 3/3 | 3/3 | 6.0/6.1 | 532/568 |
| 252 | Encor 7247 | 3.5/3.5 | 3.5/3.5 | 6.7/7.2 | 773/579 |
| 253 | Heweten 101 | 3.5/3.5 | 3.5/3.5 | 7.0/6.5 | 672/627 |
| 254 | 110P8CP01 | 3/3 | 3/3 | 6.6/6.4 | 603/774 |
| 255 | XC5 CARB 120 | 3/3 | 3/3 | 7/7 | 721/637 |
| 256 | XC5 CARB 80 | 2.5/2.5/ | 2.5/2.5 | 6.7/6.9 | 666/677 |

[1]Scale is 1 = poor to 5 = excellent
[2]The first values are for the low loading sample and the second values are for the high loading samples
[3]Pulled up the wood surface deep into the wood
[4]Emulsion failed, so testing was not possible
[5]Dolly adhesive failure.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A composition comprising:
an adhesion promoting agent or a mixture of adhesion promoting agents, where the adhesion prompting agent or agents are selected from the group consisting of styrene-acrylic copolymers, acrylic polymers, low volatile organic compound (VOC) alkyd polymers, low VOC long oil alkyd polymers, polyvinylchloride (PVC) polymers, derivatized polyvinylchloride polymers, block isocyanate polymers, maleic anhydride polymers, modified, chlorinated polypropylene resins, amino-functionalized silicone polymers, mercapto-functionalized silicone polymers, epoxy-functionalized silicone polymers, epoxy resins, and mixtures thereof,
a low vapor pressure (LVP) solvent comprising a hydrocarbon solvent, a glycol ether, 1,3-butanediol, 1,4-butanediol, 1,5-pentanediol, 1-tetradecene, 2-pyrrolidone, 2-butoxy-1-propanol, 2-methyl-2,4-pentanediol, a soy methyl ester, a methyl oleate, benzyl alcohol, a dibasic ester, a dialkyl phthalate, diethanolamine, a glycol ether acetate, N,N'-diethyl-m-toluamide, a triethylene glycol, a triisopropanolamine, a tripropylene glycol, or mixtures thereof, and
a co-solvent selected from the group consisting of methyl acetate, acetone, parachlorobenzotrifluoride (PCBTF), t-butyl acetate, a fluorinated alkane, methylene chloride, tetrachloroethylene, a methylated siloxane, d-limonene, ethyl lactate, or mixtures thereof,
wherein the hydrocarbon solvent is selected from the group consisting of an isoparaffinic hydrocarbon, an aromatic hydrocarbon, and mixtures thereof.

2. The composition of claim 1, further comprising:
a nonionic surfactant, an ionic surfactant, or mixtures thereof,
a biocide,
a UV stabilizer,
a wetting agent selected from the group consisting of methyl siloxanes, non-alkylphenol ethoxylate surfactants, and fluorinated compounds, or
a defoamer, or
mixtures thereof.

3. The composition of claim 2, wherein:
the nonionic surfactants are selected from the group consisting of nonionic seed oil surfactants, biodegradable nonionic seed oil surfactants, low odor nonionic alcohol ethoxylate surfactants, biodegradable nonionic alcohol ethoxylate surfactants, nonionic alcohol ethoxylate surfactants, non-ionic surfactants based on a synthetic primary alcohol with >80% linearity, non-ionic surfactants based on tridecyl alcohol, biodegradable alcohol ethoxylate surfactants comprising blends of ethoxylated $C_8$-$C_{10}$ alcohols, $C_{14}$-$C_{16}$ alcohols, $C_9$ alcohols and $C_{11}$ alcohols, and mixtures thereof, and
the ionic surfactants are fluorosurfactants.

4. The composition of claim 1, further comprising:
a nonionic surfactant, an ionic surfactant, or mixtures thereof, and
water or an aqueous solution to form a water-in-oil emulsion or a water-in-oil microemulsion or an oil-in-water emulsion or an oil-in-water microemulsion.

5. The composition of claim 4, wherein:
the nonionic surfactants are selected from the group consisting of nonionic seed oil surfactants, biodegradable nonionic seed oil surfactants, low odor nonionic alcohol ethoxylate surfactants, biodegradable nonionic alcohol ethoxylate surfactants, nonionic alcohol ethoxylate surfactants, non-ionic surfactants based on a synthetic primary alcohol with >80% linearity, non-ionic surfactants based on tridecyl alcohol, biodegradable alcohol ethoxylate surfactants comprising blends of ethoxylated $C_8$-$C_{10}$ alcohols, $C_{14}$-$C_{16}$ alcohols, $C_9$ alcohols and $C_{11}$ alcohols, and mixtures thereof, and
the ionic surfactants are fluorosurfactants.

6. A composition comprising:
an adhesion promoting agent or a mixture of adhesion promoting agents, where the adhesion prompting agent or agents are selected from the group consisting of styrene-acrylic copolymers, acrylic polymers, low volatile organic compound (VOC) alkyd polymers, low VOC long oil alkyd polymers, polyvinylchloride (PVC) polymers, derivatized polyvinylchloride polymers, blocked isocyanate polymers, maleic anhydride polymers, modified, chlorinated polypropylene resins, amino-functionalized silicone polymers, mercapto-functionalized silicone polymers, epoxy-functionalized silicone polymers, epoxy resins, and mixtures thereof,
a nonionic surfactant, an ionic surfactant, or mixtures thereof,
a low vapor pressure (LVP) solvent selected from the group consisting of a hydrocarbon solvent, a glycol ether, 1,3-butanediol, 1,4-butanediol, 1,5-pentanediol, 1-tetradecene, 2-pyrrolidone, 2-butoxy-1-propanol, 2-methyl-2,4-pentanediol, a soy methyl ester, a methyl oleate, benzyl alcohol, a dibasic ester, a dialkyl phthalate, diethanolamine, a glycol ether, a glycol ether acetate, N,N'-diethyl-m-toluamide, a triethylene glycol, a triisopropanolamine, a tripropylene glycol, or mixtures thereof,
a co-solvent selected from the group consisting of methyl acetate, acetone, parachlorobenzotrifluoride (PCBTF), t-butyl acetate, a fluorinated alkane, methylene chloride, tetrachloroethylene, a methylated siloxane, d-limonene, ethyl lactate, or mixtures thereof,
a solid selected from the group consisting of polytetrafluoroethylene (PTFE) particles, micronized polyolefins, micronized oxidized polyolefin waxes, micronized paraffin waxes, metal oxides, fumed silica, calcium carbonate, ceramic microspheres, glass bubbles, and glass beads,
a drying agent selected from the group consisting of ZnO nanoparticles or solutions of Zn, Mn, Co, and Zr salts, and
a crosslinking agent comprising polyisocyanates,
wherein the hydrocarbon solvent is selected from the group consisting of an isoparaffinic hydrocarbon, an aromatic hydrocarbon, and mixtures thereof.

7. The composition of claim 6, further comprising:
a biocide,
a UV stabilizer,
a wetting agent selected from the group consisting of methyl siloxanes, non-alkylphenol ethoxylate surfactants, and fluorinated compounds,
a defoamer, or
mixtures and combinations thereof.

8. The composition of claim 6, wherein:
the nonionic surfactants are selected from the group consisting of nonionic seed oil surfactants, biodegradable nonionic seed oil surfactants, low odor nonionic alcohol ethoxylate surfactants, biodegradable nonionic alcohol ethoxylate surfactants, nonionic alcohol ethoxylate surfactants, non-ionic surfactants based on a synthetic primary alcohol with >80% linearity, non-ionic surfactants based on tridecyl alcohol, biodegradable alcohol ethoxylate surfactants comprising blends of ethoxylated $C_8$-$C_{10}$ alcohols, $C_{14}$-$C_{16}$ alcohols, $C_9$ alcohols and $C_{11}$ alcohols, and mixtures thereof, and the ionic surfactants are fluorosurfactants.

9. The composition of claim 6, further comprising:
a nonionic surfactant, an ionic surfactant, or mixtures thereof, and
water or an aqueous solution to form a water-in-oil emulsion or microemulsion or an oil-in-water emulsion or microemulsion.

10. The composition of claim 9, wherein:
the nonionic surfactants are selected from the group consisting of nonionic seed oil surfactants, biodegradable nonionic seed oil surfactants, low odor nonionic alcohol ethoxylate surfactants, biodegradable nonionic alcohol ethoxylate surfactants, nonionic alcohol ethoxylate surfactants, non-ionic surfactants based on a synthetic primary alcohol with >80% linearity, non-ionic surfactants based on tridecyl alcohol, biodegradable alcohol ethoxylate surfactants comprising blends of ethoxylated $C_8$-$C_{10}$ alcohols, $C_{14}$-$C_{16}$ alcohols, $C_9$ alcohols and $C_{11}$ alcohols, and mixtures thereof, and
the ionic surfactants are fluorosurfactants.

* * * * *